(12) United States Patent
Wojcik

(10) Patent No.: US 11,768,767 B2
(45) Date of Patent: Sep. 26, 2023

(54) OPAQUE OBJECT CACHING

(71) Applicant: MICRO FOCUS LLC, Santa Clara, CA (US)

(72) Inventor: Michael Wojcik, Troy, MI (US)

(73) Assignee: MICRO FOCUS LLC, Santa Clara, CA (US)

( * ) Notice: Subject to any disclaimer, the term of this patent is extended or adjusted under 35 U.S.C. 154(b) by 38 days.

(21) Appl. No.: 17/514,928

(22) Filed: Oct. 29, 2021

(65) Prior Publication Data

US 2023/0135316 A1    May 4, 2023

(51) Int. Cl.
G06F 12/0802    (2016.01)
G06F 16/903    (2019.01)
G06F 12/02    (2006.01)

(52) U.S. Cl.
CPC ...... *G06F 12/0802* (2013.01); *G06F 12/0261* (2013.01); *G06F 16/90335* (2019.01); *G06F 2212/60* (2013.01)

(58) Field of Classification Search
None
See application file for complete search history.

(56) References Cited

U.S. PATENT DOCUMENTS

| 6,345,266 | B1 | 2/2002 | Ganguly et al. |
| 6,347,312 | B1 | 2/2002 | Byrne et al. |
| 6,539,382 | B1 | 3/2003 | Byrne et al. |
| 6,742,084 | B1 | 5/2004 | Defouw et al. |
| 7,035,846 | B2 | 4/2006 | Gupta et al. |
| 7,363,429 | B2 | 4/2008 | Wu et al. |
| 7,617,257 | B2 | 11/2009 | Sathyanarayan et al. |
| 7,844,710 | B2 | 11/2010 | Rathi |

(Continued)

FOREIGN PATENT DOCUMENTS

| EP | 2980703 A2 * | 2/2016 | ......... G06F 12/0875 |
| EP | 2564330 | 2/2018 | |

(Continued)

OTHER PUBLICATIONS

Johnson, T. L., Connors, D. A., & Hwu, W. W. (Jan, 1998). Run-time adaptive cache management. In Proceedings of the Thirty-First Hawaii International Conference on System Sciences (vol. 7, pp. 774-775). IEEE. (Year: 1998).*

(Continued)

*Primary Examiner* — Uyen T Le
(74) *Attorney, Agent, or Firm* — SHERIDAN ROSS P.C.

(57) ABSTRACT

A query for opaque objects stored within a data store and not currently cached within a cache is received from an application. The query to the data store is passed to the data store, and a handle to memory location is received from the data store at which the data store has temporarily stored a message including the opaque objects. The opaque objects are added to the cache by treating the memory location as a cache entry for the opaque objects. Cache metadata for the cache entry is generated, and along with the handle is stored within a metadata cache entry of a metadata cache structure separate from the message. The handle and the cache metadata can be returned to the application, where the cache metadata can be returned as an opaque context of the cache entry.

20 Claims, 9 Drawing Sheets

(56) References Cited

U.S. PATENT DOCUMENTS

| | | | |
|---|---|---|---|
| 8,028,011 B1* | 9/2011 | Pawar | G06F 16/172 |
| | | | 711/129 |
| 8,156,484 B2 | 4/2012 | Smith | |
| 8,239,632 B2 | 8/2012 | Dowlatkhah | |
| 8,326,828 B2 | 12/2012 | Zhou et al. | |
| 8,850,122 B2 | 9/2014 | Chockler et al. | |
| 9,104,552 B1* | 8/2015 | Bolt | G06F 12/127 |
| 9,274,956 B1 | 3/2016 | Salyers et al. | |
| 9,921,963 B1 | 3/2018 | Li et al. | |
| 9,954,971 B1 | 4/2018 | Luck et al. | |
| 2006/0143350 A1* | 6/2006 | Miloushev | G06F 9/5027 |
| | | | 710/242 |
| 2008/0040395 A1 | 2/2008 | Danoyan | |
| 2008/0040550 A1 | 2/2008 | Lindner | |
| 2008/0147974 A1 | 6/2008 | Madison et al. | |
| 2009/0043786 A1* | 2/2009 | Schmidt | G06F 16/13 |
| 2016/0004456 A1 | 1/2016 | Benhase et al. | |
| 2016/0062916 A1 | 3/2016 | Das et al. | |
| 2017/0315928 A1 | 11/2017 | Hangud et al. | |

FOREIGN PATENT DOCUMENTS

| | | |
|---|---|---|
| JP | 5675963 | 2/2015 |
| WO | 0115004 | 3/2001 |

OTHER PUBLICATIONS

Beckmann et al., "Bridging Theory and Practice in Cache Replacement", Computer Science and Artificial Intelligence Laboratory Technical Report, MIT-CSAIL-TR-2015-034, Dec. 19, 2015, 16pp.

Amza et al., "Transparent Caching with Strong Consistency in Dynamic Content Web Sites", ICS'05, Jun. 20-22, 2005 Boston, MA, USA. 10pp.

Chakraborty et al., "Multicopy Cache: A Highly Energy-Efficient Cache Architecture", ACM Transactions on Embedded Computing Systems, vol. 13, No. 5s, Article 150, Jul. 2014.

Chidlovskii et al., "Semantic caching of Web queries", The VLDB Journal (2000) 9: 2-17.

Cluet et al., "Using LDAP Directory Caches", PODS'99: Proceedings of the 18th ACM SIGMOD-SIGACT-SIGART symposium on Principles of database systems. May 1999, 273-284.

Dai et al., "ETD-Cache: An Expiration-Time Driven Cache Scheme to Make SSD-based Read Cache Endurable and Cost-efficient", Proceedings of the 12th ACM International Conference on Computing Frontiers, 2015.

Jiang et al., "LIRS: An Efficient Low Inter-reference Recency Set Replacement Policy to Improve Buffer Cache Performance", ACM SIGMETRICS Performance Evaluation Review, vol. 30, Issue 1, Jun. 2002, 31-42, https://doi.org/10.1145/511399.511340.

Kapitskaia et al., "Evolution and Revolutions in LDAP Directory Caches", EDBT 2000, LNCS 1777, pp. 202-216, 2000.

Kirilin et al., "RL-Cache: Learning-Based Cache Admission for Content Delivery", ANetAI 2019, Aug. 23, 2019, Beijing, China, https://doi.org/10.1145/3341216.3342214.

Lee et al., "Semantic Caching via Query Matching for Web Sources", In Proc. 8th ACM Int'l Conf, on Information and Knowledge Management (CIKM), Kansas City, Missouri, USA, Nov. 1999.

Lykouris et al., "Competitive Caching with Machine Learned Advice", Proceedings of the 35th International Conference on Machine Learning, Stockholm, Sweden, PMLR 80, 2018.

Pinto et al., "Hoard: a Distributed Data Caching System To Accelerate Deeplearning Training On the Cloud", Dec. 3, 2018.

Sengar et al., "Design and Implementation of Micro Caching", ISEC'09, Feb. 23-26, 2009, Pune, India. Copyright 2009 ACM 978-1-60558-426-Mar. 9, 2002.

Singaru et al., "A Generic Lookup Cache Architecture for Network Processing Applications", FPGA '06, Proceedings of the 2006 ACM/SIGDA 14th international symposium on field programmable gate arrays, Feb. 2006.

Spanoudakis et al., "On the Use of Optimal Stopping Theory for Improving Cache Consistency", WISE 2012, LNCS 7651, pp. 87-99, 2012.

* cited by examiner

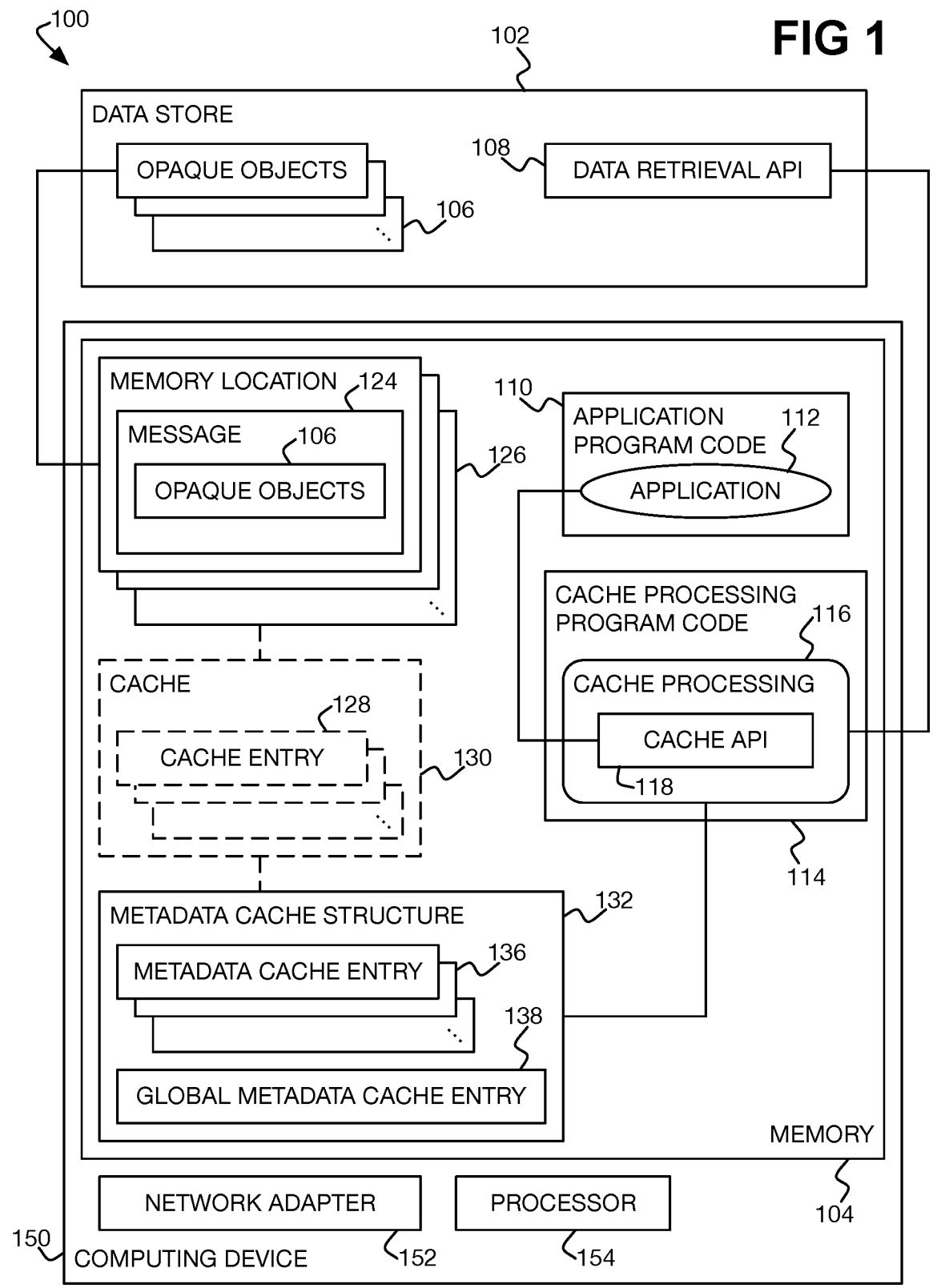

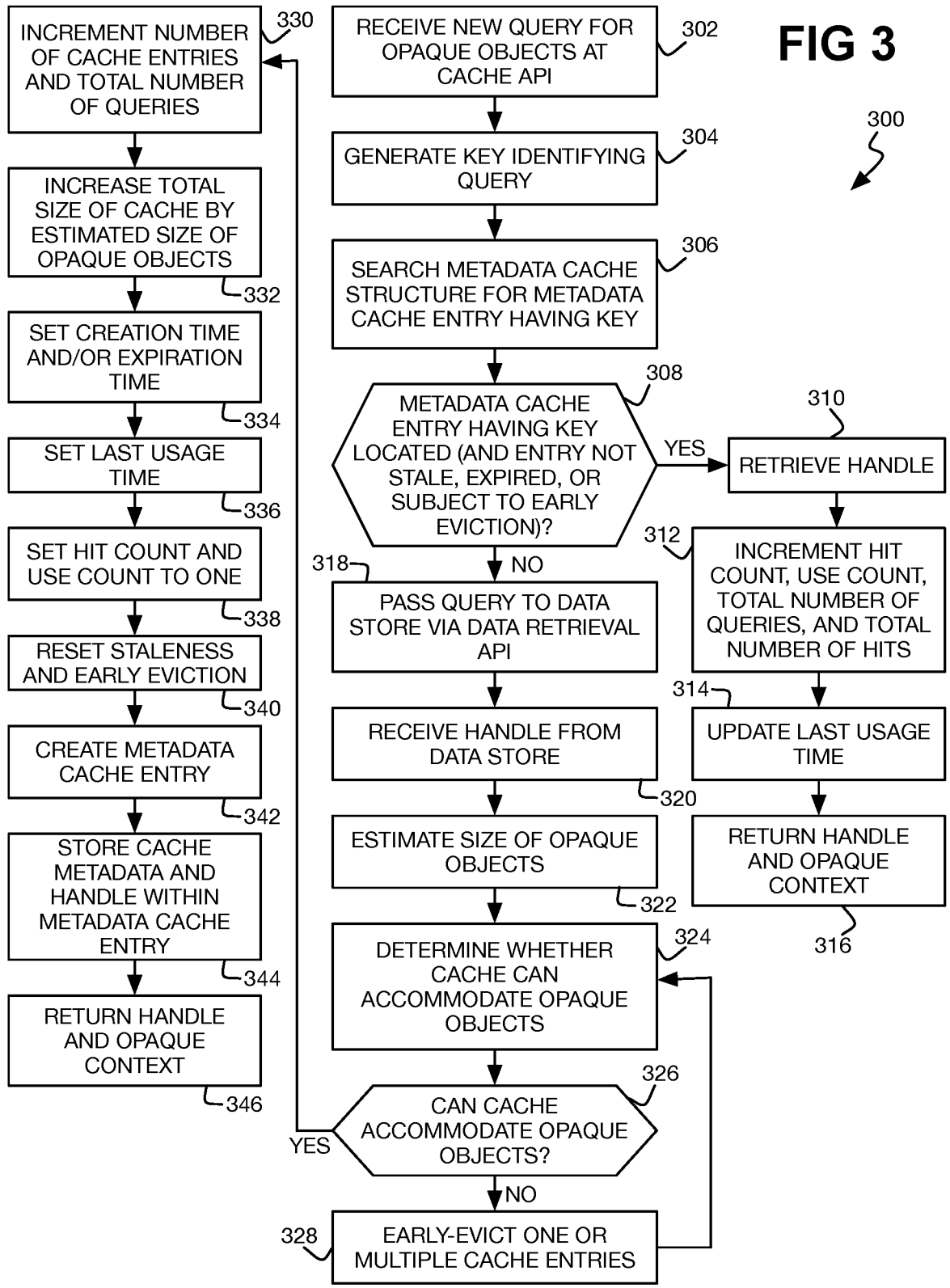

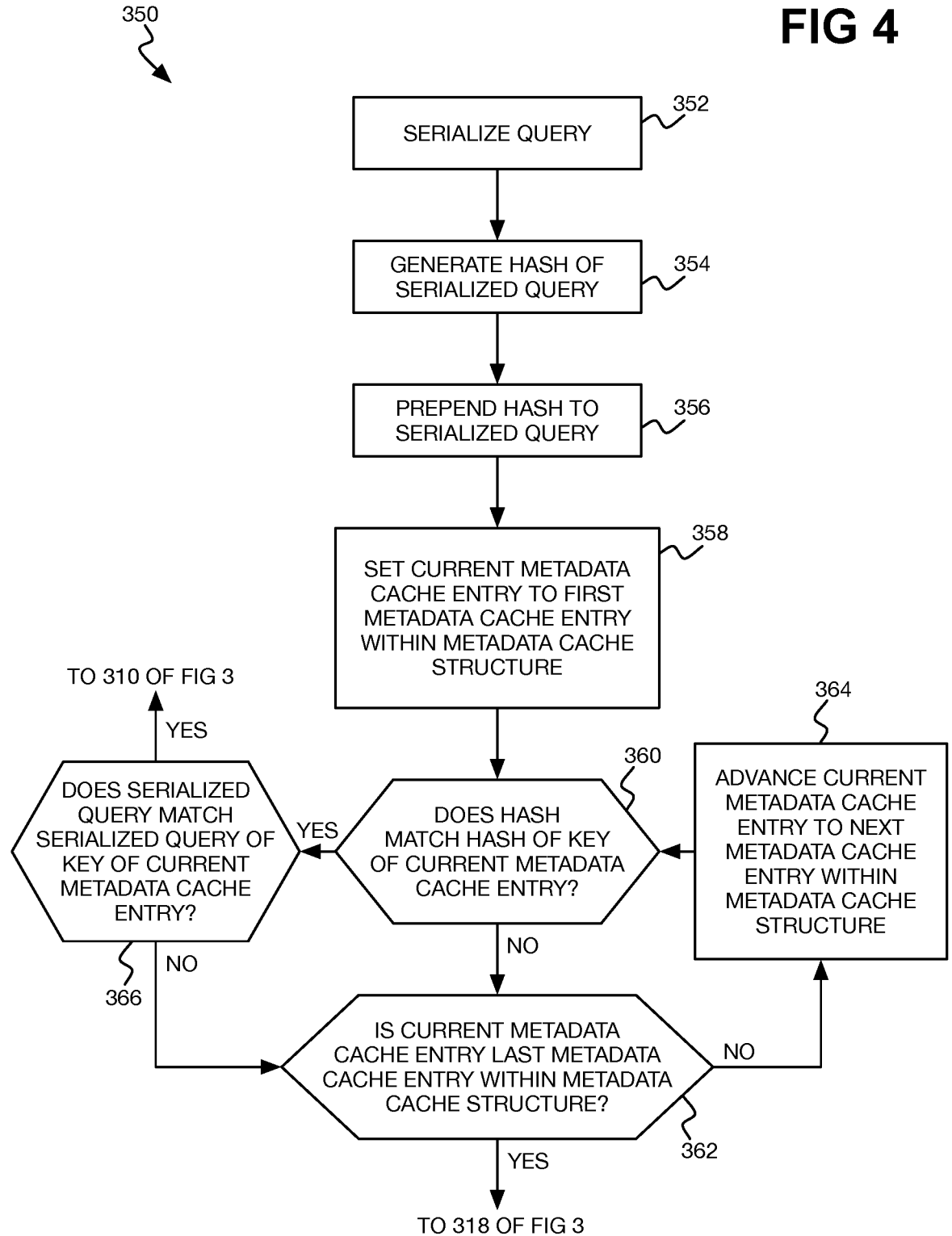

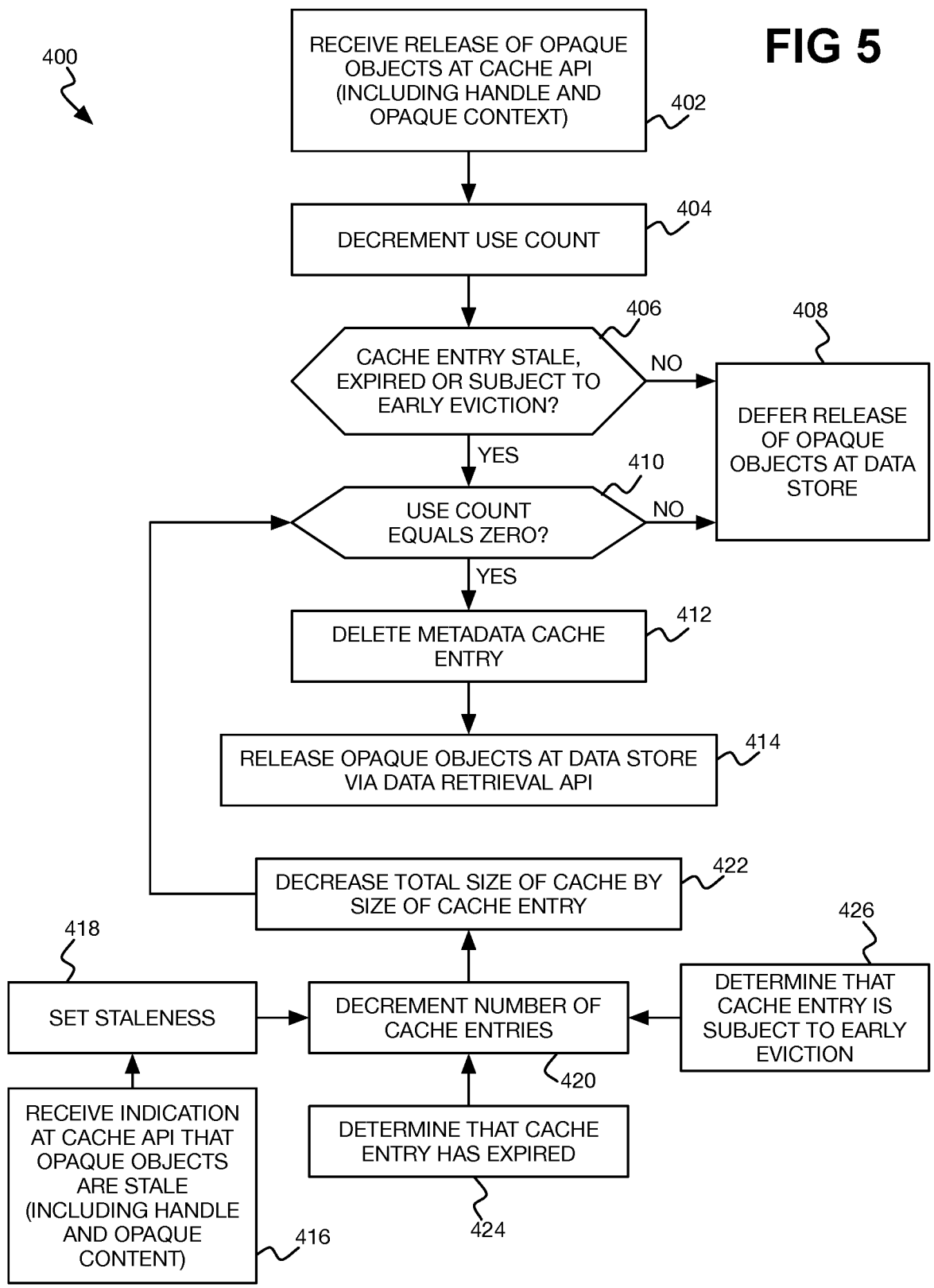

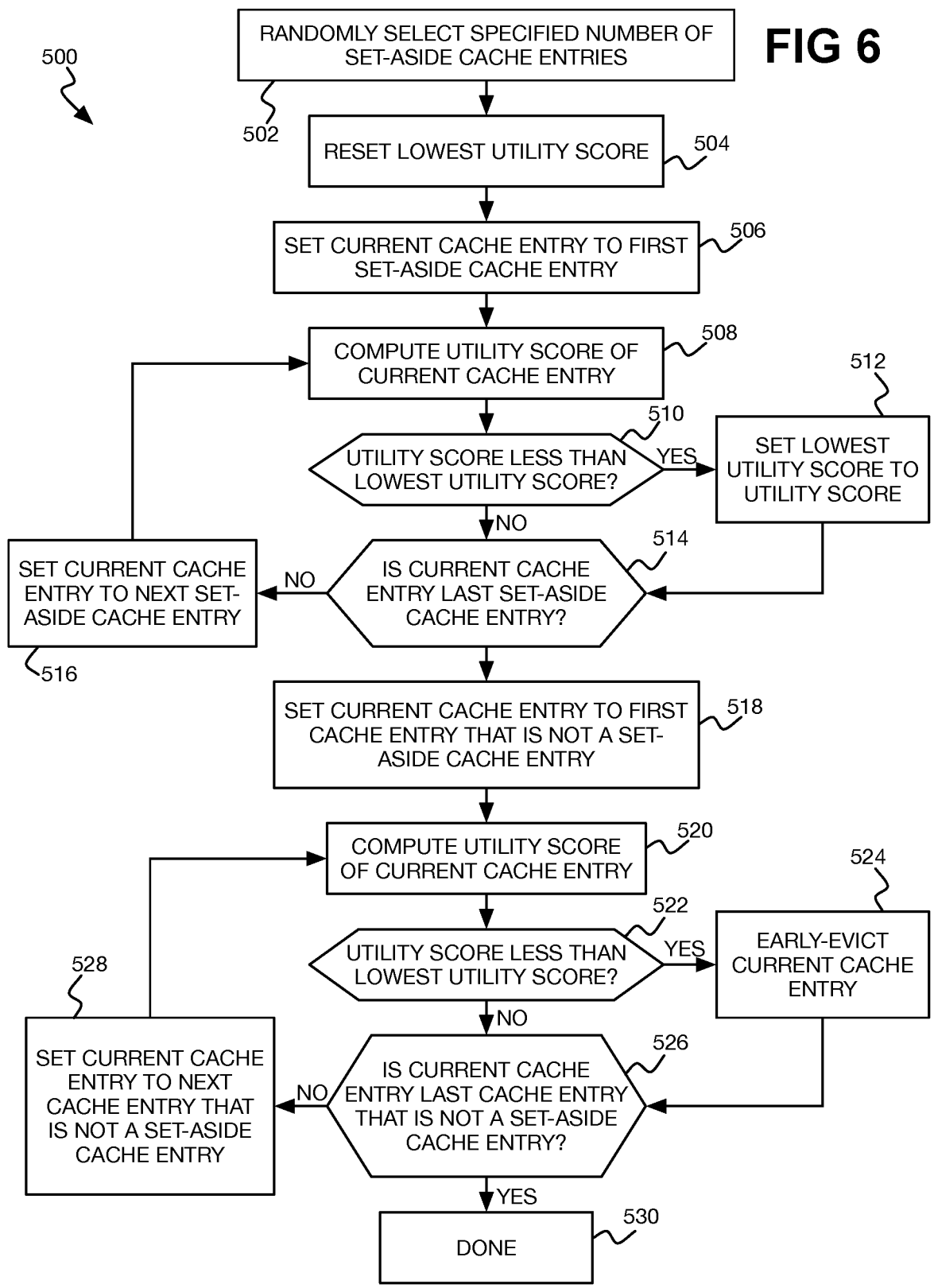

OPAQUE OBJECT CACHING

BACKGROUND

Data stores can store a variety of different types of data, including data objects such as opaque data objects. A data object can be considered a collection of attributes, groups of values, or a collection of multiple data points that are related in some manner. An opaque data object, which can also be referred to simply as an opaque object, is a data object whose data structure may not be explicitly defined in an exposed interface, and therefore whose data cannot be completely ascertained and thus is unknowable except through the data store responsible for the object. An example of an opaque data object is a Lightweight Directory Access Protocol (LDAP) data object that stores information regarding organizations, individuals, and other resources according to the LDAP.

BRIEF DESCRIPTION OF THE DRAWINGS

FIG. 1 is a diagram of an example system for opaque object cache caching in which the memory locations at which opaque objects satisfying queries are treated as cache entries of an opaque object cache that has an associated metadata cache structure storing cache metadata for the cache entries as well as global cache metadata.

FIG. 3 is a flowchart of an example method for processing a new query for opaque objects, including adding a cache entry to the opaque object cache of FIG. 1 and an associated metadata cache entry to the metadata cache structure of FIG. 1 if the opaque objects are not already stored in the opaque object cache.

FIG. 4 is a flowchart of an example method that can be used in the method of FIG. 3 for generating a key identifying a query for opaque objects and for searching existing metadata cache entries within the metadata cache structure of FIG. 1 for the key.

FIG. 5 is a flowchart of an example method for evicting a cache entry from the opaque object cache of FIG. 1, including deleting the associated metadata cache entry from the metadata cache structure of FIG. 1, and which has various entry points corresponding to application release of the opaque objects, application indication of cache entry staleness, cache entry expiration, and cache entry early eviction.

FIG. 6 is a flowchart of an example method that can be used in the method of FIG. 3 for early-evicting cache entries from the opaque object cache of FIG. 1.

DETAILED DESCRIPTION

Figure 2A:
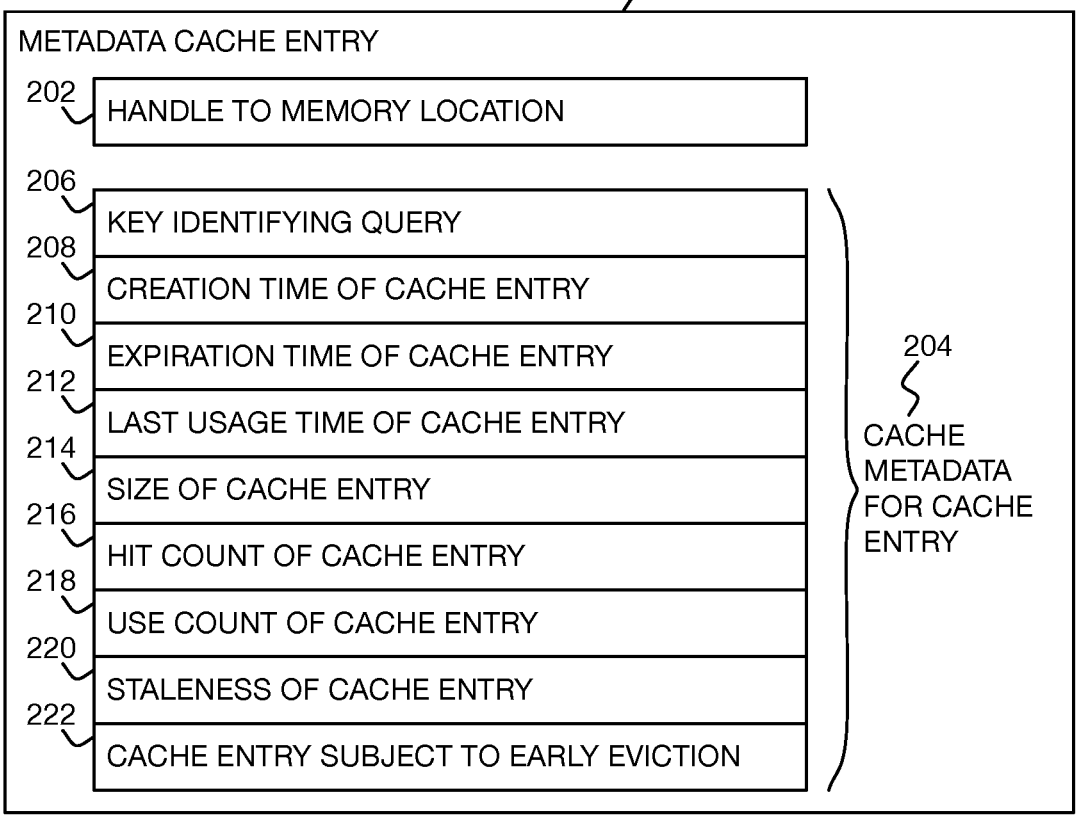
FIGS. 2A and 2B are diagrams of an example metadata cache entry and an example global metadata cache entry, respectively, of the metadata cache structure of FIG. 1.

As noted in the background, a data store may store opaque data objects. To provide access to the opaque objects, a data store may expose a data retrieval application programming interface (API). An application may submit a query to the data store via the data retrieval API to access data objects that satisfy the query. In response, the data store may retrieve the matching opaque objects, temporarily store them in memory accessible to the application, and return a handle to the memory location in question to the application.

Since the data objects are opaque, the amount of memory they occupy at the memory location (i.e., their size) may not be able to be precisely determined and thus is ultimately unknowable. The application can submit follow-up queries referencing the handle to the data store, again via the data retrieval API, to retrieve desired data values of the opaque objects in question. When the application is finished with the data objects, the application releases the objects at the data store via the data retrieval API. The memory location at which the opaque objects are stored is then freed; that is, the objects are no longer considered temporarily stored in the memory.

The same or different threads of a multithreaded application, as well as the same or different application more generally, may repeatedly issue the same query to the data store via the data retrieval API to retrieve the same opaque objects from the data store. Each time the query is received, the data store has to process the query, retrieve the matching opaque objects, and store them in memory for the application thread or application that issued the query. This process can overly tax the data store and the communicative connection (e.g., a network) interconnecting the data store and the memory, reducing overall performance.

Ordinary caching cannot be employed with data stores storing opaque data objects to alleviate this issue, however. Typical caching involves well defined data types, in which the caching system has complete knowledge of the data returned by a data store, such that the caching system can be constructed in accordance with this understanding of the specifics of the data to be cached. For example, in memory line or page caching, a given memory line or page has a known size, and the contents of the memory line or page are returned by the data store (e.g., a dynamic random-access memory (DRAM) in this case). Therefore, the caching system can be designed to accommodate the known size of each memory line or page, and further is easily able to cache the memory lines or pages, since the data store provides the contents of the retrieved memory lines or pages.

By comparison, with opaque data objects, the data type of the objects is by definition not completely known since the data objects are opaque. The size of the matching opaque objects varies depending on the query. Moreover, the size is not knowable, and the contents of the matching opaque objects are not explicitly returned. Rather, as noted above, a handle to the memory location at which the matching opaque objects have been stored is returned, where follow-up queries regarding the objects are submitted by passing the handle. That is, the contents of the objects within memory are not retrievable except through follow-up queries and are thus not directly retrievable. Existing caching techniques are therefore inapplicable to opaque objects.

Described herein are techniques for caching opaque objects. Applications submit queries to a cache API instead of to the data retrieval API exposed by the data store storing the opaque objects. When a new (as opposed to a follow-up) query is received at the cache API, if the opaque objects satisfying the query are not already cached, then the query is passed to the data store via the data retrieval API. The memory location at which the data store stores the retrieved opaque objects is treated as a cache entry for the opaque objects within the cache. The cache is thus discontiguous, including the various memory locations at which the data store stores opaque objects matching queries. A metadata cache structure, which may by comparison be contiguous, is also maintained, and stores cache metadata regarding the cache entries, as well as global cache metadata.

When an application is finished processing the opaque objects satisfying an earlier issued query, the application releases the opaque objects via the cache API. If other threads of the same application, or if other applications, are still using the opaque objects (i.e., where these other threads or other applications also previously submitted the same query), however, release of the opaque objects at the data store via the data retrieval API is deferred. Opaque object release at the data store via the data retrieval API is also deferred if the cache entry in question has not been indicated as being stale, is not subject to early eviction, and has not expired. Once all application threads and applications have finished processing the opaque objects, and the cache entry has been indicated as being stale, is subject to early eviction, and/or has expired, just then are the opaque objects released at the data store via the data retrieval API.

However, if an application indicates that a cache entry is stale, if the cache entry has expired, or if the cache entry is subject to early eviction, the cache entry may not be considered as part of the cache any longer, even if other application threads or applications are still using the opaque objects. When the same query is subsequently received, therefore, the cache entry is not used in satisfaction of the query, since the entry is no longer considered as part of the cache. Any other application threads or applications still using the opaque objects can continue to do so until they release the objects via the cache API. As above, release of the opaque objects at the data store is deferred until all application threads and applications have finished using the opaque objects, at which time the objects are released at the data store via the data retrieval API.

FIG. 1 shows an example system 100 including a data store 102 and a memory 104. The data store 102 stores opaque objects 106, such as Lightweight Data Access Protocol (LDAP) objects, or other types of opaque objects. The data store 102 may be a database management system (DBMS) that stores the opaque objects 106 within non-volatile storage, such as one or multiple hard disk drives, solid state drives, and so on. The data store 102 exposes or reveals a data retrieval API 108 at which new queries are submitted to retrieve matching opaque objects 106, at which follow-up queries are submitted to retrieve details regarding and specific data of the matching opaque objects 106 of a previously submitted query, and at which the matching opaque objects 106 of a previously submitted query are released.

The memory 104 may be a volatile memory, such as a DRAM. The memory 104 in the example is part of a computing device 150 that is separate from the data store 102. The computing device 150 may thus include a network adapter 152 to communicatively connect the computing device 150 to the data store 102 over a network, such as an Ethernet network, a storage-area network (SAN), and so on. The data store 102 may be implemented as a computing device apart from the computing device 150. The computing device 150 may be a server, desktop, laptop, or notebook computer, among other types of computing devices. In another implementation, the data store 102 may be part of the computing device 150, however.

The computing device 150 includes a processor 154 that executes application program code 110 to implement, realize, or effectuate an application 112. There may be multiple applications 112, and each application 112 may be a multithreaded application having multiple concurrently executing application threads. The application 112 is a computer program that uses the opaque objects 106 stored at the data store 102, and has at least one application thread.

The processor 154 of the computing device 150 further executes cache processing program code 114 to implement, release, or effectuate cache processing 116. The cache processing 116 provides for caching of the opaque objects 106 used by the application 112. The cache processing 116 exposes or reveals a cache API 118 that the application 112 uses in lieu of the data retrieval API 108 to access the opaque objects 106 of the data store 102. The cache API 118 mirrors at least some of the functionality provided by the data retrieval API 108 of the data store 102. For example, the application 112 can submit new queries for opaque objects 106, submit follow-up queries as to the matching (and not yet released) opaque objects 106 of previously submitted queries, and release the matching opaque objects 106 via the cache API 118.

When the application 112 submits a new query for opaque objects 106 at the cache API 118 that are not currently being cached, the cache processing 116 passes the query to the data store 102 via the data retrieval API 108. The data store 102 in turn retrieves the opaque objects 106 matching the query and stores them in a message 124 at a memory location 126 of the memory 104. In another implementation, the memory location 126 may be part of a different memory than the memory 104 where the application program code 110 and the cache processing program code 114 are stored. The data store 102 returns to the cache processing 116 a handle to the memory location 126 of the memory 104 at which the data store 102 stored the opaque objects 106 matching the query in a message 124. The cache processing 116 returns the handle to the application 112 for referencing when the application 112 submits follow-up queries and ultimately releases the opaque objects 106 via the cache API 118.

As the data store 102 receives different new queries at the data retrieval API 108, the data store 102 thus stores the matching opaque objects 106 in question within different messages 124 at different and potentially discontiguous memory locations 126. The memory locations 126 at which the matching opaque objects 106 of different queries are stored are treated by the cache processing 116 as corresponding cache entries 128 of a cache 130 storing the opaque objects 106. That is, the storage of matching opaque objects 106 within messages 124 at memory locations 126 by the data store 102 is leveraged for caching purposes. The cache 130 and the cache entries 128 are depicted with dashed lines in FIG. 1 since the cache 130 and its cache entries 128 do not exist apart from the memory locations 126 at which the matching opaque objects 106 are stored. The cache processing 116 itself thus does not store the opaque objects 106. Indeed, because the opaque objects 106 are opaque outside of the data store 102, the precise size of the objects 106 is unknowable to the cache processing 116, and the processing 116 can obtain specifics of and regarding the objects 106 just through the data retrieval API 108.

The cache processing 116 does, however, maintain a metadata cache structure 132 including metadata cache entries 136 corresponding to the cache entries 128 of the cache 130 for the opaque objects 106. Each metadata cache entry 136 stores cache metadata regarding its corresponding cache entry 128. The metadata cache structure 132 can also include a global metadata cache entry 138 storing global cache metadata regarding the cache 130 as a whole. Different types of information that can be stored in each metadata cache entry 136 and in the global metadata cache entry 138 are described later in the detailed description. The metadata cache structure 132 may be stored in the form of a table or another type of data structure.

In operation, then, when the cache processing 116 receives a new query for currently uncached opaque objects 106 from the application 112 at the cache API 118, the cache processing 116 passes the query to the data store 102 at the data retrieval API 108, as noted above. The cache processing 116 receives a handle to the memory location 126 within the memory 104 at which the data store 102 stored the matching opaque objects 106 within a message 124, and passes the handle to the application 112 for subsequent reference during follow-up queries and ultimate release of the opaque objects 106, as also noted above. The cache processing 116 also creates a metadata cache entry 136 storing cache metadata regarding the cache entry 128 in question within the metadata cache structure 132, and may accordingly update global cache metadata within the global metadata cache entry 138.

The application 112 can then submit follow-up queries regarding the matching opaque objects 106 of the cache entry 128 via the cache API 118. As part of such follow-up queries, the application 112 provides the provided handle to the memory location 126 at which the opaque objects 106 have been stored. The cache processing 116 in turn passes the follow-up queries to the data store 102, and returns follow-up query results received from the data store 102 to the application 112. In another implementation, the application 112 may submit follow-up queries directly to the data store 102 via the data retrieval API 108, again providing the provided handle to the memory location 126 in question, and thus receive query results back directly from the data store 102.

Once the application 112 has finished using the matching opaque objects 106 of the cache entry 128, the application 112 releases the opaque objects 106 via the cache API 118. However, because the opaque objects 106 are being cached in a corresponding cache entry 128 of the cache 130, the cache processing 116 may not immediately release the opaque objects 106 at the data store 102 via the data retrieval API 108. Rather, if any threads of the same application 112, or another application 112, is still using the opaque objects 106 of the cache entry 128, and/or if the cache entry 128 has not been indicated as being stale, has not yet expired, and is not subject to early eviction, then the cache processing 116 defers release of the opaque objects 106 at the data store 102. Just once no other threads of the same or different application 112 are using the opaque objects 106, and the cache entry 128 has been indicated as being stale, has expired, or is subject to early eviction, does the cache processing 116 release the opaque objects 106 at the data store 102 via the data retrieval API 108. Release at the data store 102 frees the memory 104 at which the data store 102 stored the message 124 including the opaque objects 106 at the memory location 126.

Once a thread of an application 112 has released the opaque objects 106 via the cache API 118, if the thread again submits the same query for these opaque objects 106 at the cache API 118, the query is considered a new query from the perspective of that thread. Other threads of the same or different application 112 may also submit this same query via the cache API 118. The first time each such thread submits the query, and each subsequent time each thread does so after having released the opaque objects 106 via the cache API 118, the query is also considered a new query from the perspective of that thread. Assuming that the opaque objects 106 in question have not been released at the data store 102 via the data retrieval API 108, and thus remain cached in a cache entry 128, the cache processing 116 returns a handle to the memory location 126 at which the opaque objects 106 are stored in response to the new query. That is, the cache processing 116 does not pass the query to the data store 102 via the data retrieval API 108 since the opaque objects 106 are cached in the cache 130.

The handle that the application 112 receives in response to submission of a new query to the cache processing 116 at the cache API 118 may be considered as an opaque context of the cache entry 128 at which the matching opaque objects 106 are cached, or as part of this opaque context. In general, the opaque context can include, completely or partially, the cache metadata for the cache entry 128 in question as stored within the corresponding metadata cache entry 136. The context is opaque in that it is opaque to the application 112. That is, the information contained in the context is not directly usable and may not be understood by the application 112. Rather, the application 112 simply passes the context (i.e., at least the handle) when submitting follow-up queries, and when releasing the opaque objects 106 via the cache API 118. The context, and specifically the handle, permit the cache processing 116 to identify the cache entry 128 storing the opaque objects 106 that is the subject of the follow-up query or the release.

FIG. 2A shows an example metadata cache entry 136. There is a metadata cache entry 136 for each cache entry 128 that temporarily stores the opaque objects 106 that match a corresponding query. The metadata cache entry 136 stores a handle to the memory location 126 at which the matching opaque objects 106 are stored, as well as other cache metadata 204 for the corresponding cache entry 128. The cache metadata 204 can include a key 206 uniquely identifying the query that the opaque objects 106 satisfy. A particular way by which the key 206 can be generated is described later in the detailed description.

The cache metadata 204 can include a creation time 208 and/or an expiration time 210 of the cache entry 128. The creation time 208 is the time at which the data store 102 stored the opaque objects 106 at the memory location 126 in response to receiving the query from the cache processing 116 via the data retrieval API 108. The expiration time 210 is the time of expiration of the cache entry 128. For example, there may be global cache metadata that indicates the maximum cache entry expiration time, which can also be referred to as the time to live (TTL) of any cache entry 128. The expiration time 210 of a cache entry 128 is thus equal to the creation time 208 plus the TTL.

The cache metadata 204 can include a last usage time 212 of the cache entry 128. The last usage time 212 of the cache entry 128 is the most recent time at which the cache processing 116 received a new query from any application thread for the opaque objects 106 of the cache entry 128. That is, the last usage time 212 is the most recent time at which the cache processing 116 received, as a new query, the query having the key 206. The last usage time 212 may therefore not reflect the most recent time, for instance, when any application thread submitted a follow-up query regarding the opaque objects 106 of the cache entry 128.

The cache metadata 204 can include the size 214 of the cache entry 128. The size 214 of the cache entry 128 is an estimated size, and is the estimated amount of memory that the opaque objects 106 occupy within the memory 104 at the memory location 126. The size is estimated because the opaque objects 106 are opaque outside of the data store 102 and thus are opaque to the cache processing 116. The size 214 of the cache entry 128 may also include the size of the metadata cache entry 136 corresponding to the cache entry 128, including the handle 202 and the cache metadata 204. In one implementation, the size 214 may be computed as the sum of the size of the metadata cache entry 136, the size of each visible property of each opaque object 106 of the cache entry 128 (and which may be iterated over), and an estimate of any hidden overhead of each such opaque object 106. The estimate of such hidden overhead may be based on whatever information is available as to the additional storage resources needed to implement each opaque object 106 of the cache entry 128.

The cache metadata 204 can include a hit count 216 and/or a use count 218 of the cache entry 128. The hit count 216 is the total number of times the cache processing 116 received, as a new query, the query having the key 206 from any application thread for the opaque objects 106 of the cache entry 128. Therefore, each time the cache processing 116 receives a new query from any application thread for the opaque objects 106 of the cache entry 128, the cache processing 116 increments the hit count 216. By comparison, the use count 218 is the number of active application threads or applications 112 that are currently using the opaque objects 106 of the cache entry 128. Each time the cache processing 116 receives a new query from any application thread for the opaque objects 106 of the cache entry 128, the cache processing 116 similarly increments the use count 218. Each time the cache processing 116 receives release of the opaque objects 106 from any application thread, the cache processing 116 decrements the use count 218, but does not decrement the hit count 216.

The cache metadata 204 can include a staleness 220 of the cache entry 128 and/or whether the cache entry 128 is subject to early eviction 222. Both the staleness 220 and the early eviction 222 may be Boolean flags, for instance. If the application 112 modifies the opaque objects 106 of the cache entry 128 at the data store 102, for instance, the opaque objects 106 as stored at the memory location 126 (and thus within the cache entry 128) are no longer valid from a cache coherency or consistency perspective, and therefore stale. As such, the application 112 indicates to the cache processing 116 that the cache entry 128 is stale, via the cache API 118, and the cache processing 116 responsively sets the flag indicating the staleness 220 of the cache entry 128. Similarly, if the cache processing 116 determines that the cache entry 128 is to be evicted from the cache 130 early (as opposed to when the cache entry 128 expires per its expiration time 210)—such as to accommodate a new cache entry 128 within the cache 130 for the opaque objects 106 matching a different query—the cache processing 116 sets the flag indicating that the cache entry 128 is subject to early eviction 222.

Figure 2B:
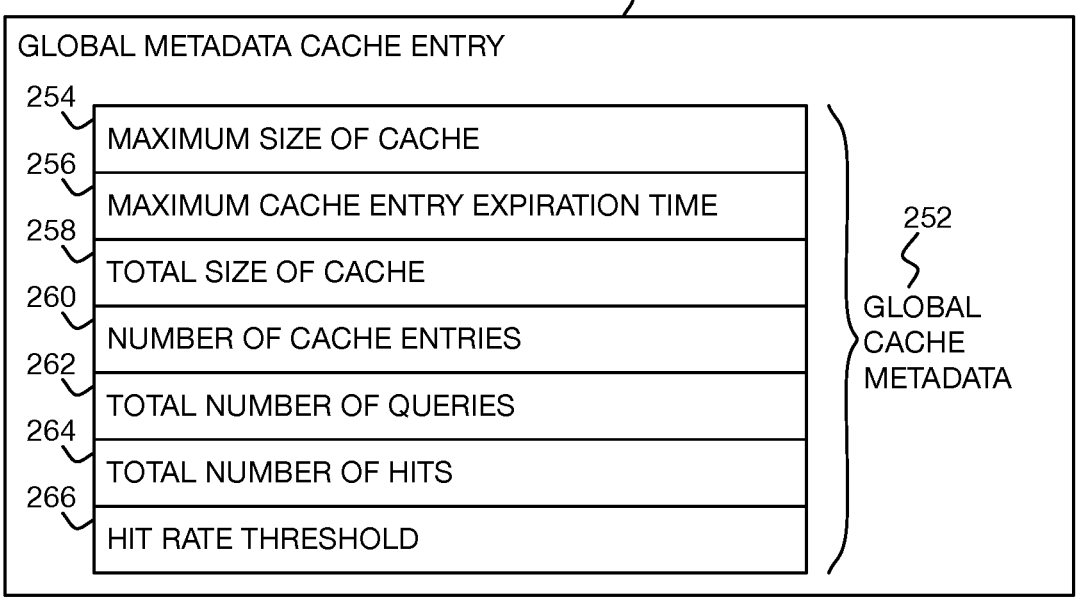

FIG. 2B shows an example global metadata cache entry 138. Whereas there are multiple metadata cache entries 136—one for each cache entry 128 of the cache 130—there can be just one global metadata cache entry 138 for the entire cache 130. The global metadata cache entry 138 stores global cache metadata 252 for the cache 130 as a whole. The global cache metadata 252 can include the maximum size 254 of the cache 130 and/or the maximum cache entry expiration time 256. The maximum size 254 of the cache 130 is the permitted maximum size that the cache 130 can be. The maximum cache entry expiration time 256 is the permitted maximum lifetime of any cache entry 128 before expiration, and is used to calculate the expiration time 210 of a cache entry 128. The maximum size 254 of the cache 130 and the maximum cache entry expiration time 256 can be user-settable parameters.

The global cache metadata 252 can include the number 260 of cache entries 128 within the cache 130 and/or the total number 262 of queries. The number 260 of cache entries 128 is the current number of cache entries 128 within the cache 130. As cache entries 128 are added to the cache 130, the number 260 is incremented, and as cache entries 128 are evicted from the cache 130, the number 260 is decremented. The total number 262 of queries is the total number of new queries that have been received by the cache processing 116 at the cache API 118. Each time the cache processing 116 receives a new query at the cache API 118, the cache processing 116 increments the total number 262 of queries, regardless of whether an existing cache entry 128 matches the query or if a new cache entry 128 has to be added for the query, and thus even if the query was previously received from the same or different application thread.

The global cache metadata 252 can include the total number 264 of hits of cache entries 128 of the cache 130 and a hit rate threshold 266. The total number 264 of hits is total number of new queries that have been received by the cache processing 116 at the cache API 118 for which there are existing cache entries 128 within the cache 130. Therefore, each time the cache processing 116 receives a new query at the cache API 118, the cache processing 116 increments the total number 264 of hits if an existing cache entry 128 matches the query (and does not increment the total number 264 if an existing cache entry 128 does not match the query). The hit rate of the cache 130 can thus be calculated as the total number 264 of hits divided by the total number 262 of queries. The hit rate threshold 266 is a threshold that governs cache introspection, as described later in the detailed description, and which can be user settable.

FIG. 3 shows an example method 300 for processing a new query for opaque objects 106 stored at the data store 102, regardless of whether the opaque objects 106 are currently cached in the cache 130 or not. The method 300 is performed by the cache processing 116 when receiving a new query for opaque objects 106 from a thread of an application 112 at the cache API 118. The method 300 can thus be implemented as the cache processing program code 114 executable by the processor 154 and stored on a non-transitory computer-readable data storage medium, such as the memory 104.

The cache processing 116 therefore receives from an application thread a new query for opaque objects 106 at the cache API 118 (302). The cache processing 116 generates the key 206 identifying the received query (304), and searches the metadata cache structure 132 for a metadata cache entry 138 having the generated key 206 (306). How the key 206 is generated for efficient searching of the metadata cache structure is described later in the detailed description.

If there is a metadata cache entry 138 having the key 206, and which corresponds to a cache entry 128 that is not stale (per the staleness 220), has not expired (per the expiration time 210 or the creation time 208 and the maximum cache entry expiration time 256), and is not subject to early eviction (per the early eviction 222) (308), then the opaque objects 106 matching the query are currently cached in the cache 130 at this cache entry 128. (The cache entry 128 is expired if the expiration time 210 is earlier than the current time, where the expiration time 210 is equal to the creation time 208 plus the maximum cache entry expiration time 256.) The cache processing 116 retrieves from the metadata cache entry 138 the handle 202 to the memory location 126 at which the opaque objects 106 are cached (310).

The cache processing 116 increments the hit count 216 and the use count 216 of the cache entry 128 within the metadata cache entry 136, as well as the total number 262 of queries and the total number 264 of hits within the global metadata cache entry 138 (312). The cache processing 116 further updates the last usage time 212 of the cache entry 128 within the metadata cache entry 136 to the current time (314), and returns the handle 202 and the opaque context to the application thread that submitted the query (316). The handle 202 may be considered as the opaque context or as part of the opaque context in this respect, and the opaque context can include any of the cache metadata 204 for the cache entry 128 as well.

However, if there is no metadata cache entry 136 having the generated key 206, and which corresponds to a cache entry 128 that is not stale, has not expired, and is not subject to early eviction (308), then the opaque objects 106 matching the query are not currently cached in the cache 130. (Note in this respect that a cache entry 128—i.e., its corresponding memory location 126—that is stale, has expired, or is subject to early eviction is not considered as being part of the cache 130.) Therefore, the cache processing 116 passes the query to the data store 102 via the data retrieval API 108 (318), which results in the data store 102 retrieving the opaque objects 106 matching the query and storing them in the memory 104 within a message 124 at a memory location 126. The cache processing 116 thus receives a handle to the memory location 126 from the data store 102 in response (320). The cache processing 116 estimates a size of the opaque objects 106, and thus a size 214 of a cache entry 128 including the opaque objects 106 if the cache entry 128 were added to the cache 130 (322).

The cache processing 116 determines whether the cache 130 can accommodate the opaque objects 106 if added to the cache 130 (324). Specifically, the cache processing 116 determines whether the estimated size of the opaque objects 106, if added to the total size 258 of the cache 130 per the global cache metadata 252 of the global metadata cache entry 138, would exceed the maximum size 254 of the cache 130 per the global cache metadata 252. If the cache 130 cannot accommodate the opaque objects 106 (326), then the cache processing early-evicts one or multiple cache entries (328), and again determines whether the cache 130 can accommodate the opaque objects 106 (330). When a cache entry 128 is early-evicted in part 328, the flag indicating such early eviction 222 can be set in the corresponding metadata cache entry 136.

Different techniques can be used to select which cache entries 128 should be evicted early. A first-in, first-out (FIFO) technique may be employed, in which the oldest cache entry 128 is evicted. The oldest cache entry 128 is the cache entry 128 having the oldest creation time 208 or the soonest expiration time 210. A least recently used (LRU) technique may be employed, in which the cache entry 128 having the oldest last usage time 212 is evicted early. Another particular approach by which cache entries are selected for early eviction is described later in the detailed description. In another implementation, early eviction may not be performed, in which case the method 300 ends at part 328 with no caching of the opaque objects 106 within a cache entry 128 of the cache 130, and instead the handle to the memory location 126 at which the opaque objects 106 are stored is returned.

Once the cache 130 can accommodate the opaque objects 106 matching the query (326), then the memory location 126 at which the opaque objects 106 are stored is treated as a new cache entry 128 within the cache 130. Specifically, the number 260 of cache entries 128 within the cache 130 is incremented within the global metadata cache entry 138, as is the total number 262 of queries (330). The total size 258 of the cache 130 is incremented by the previously calculated estimated size of the opaque objects 106 (332). The creation time 208 and/or the expiration time 210 of the new cache entry 128 is set to the current time (334), as is the last usage time 212 of the new cache entry 128 (336). The hit count 216 and the use count 218 of the cache entry 128 are each set to one (338), and the flags indicating staleness 220 and early eviction 222 are reset to false (340).

A metadata cache entry 136 for the new cache entry 128 is created within the metadata cache structure 132 (342). All the foregoing cache metadata 204 that has been specified, as well as the handle 202 to the memory location 126 corresponding to the cache entry 128, are stored within this metadata cache entry (344). The cache processing 116 then returns the handle 202 and the opaque context (346), as in the case when there is an existing cache entry 128 matching the query.

Once the method 300 has been performed for a given new query received from a given application thread, the given application thread can perform follow-up queries regarding the cached opaque objects 106 that satisfy the given new query via the handle 202 and the opaque context returned by the cache processing 116 in part 316 or 346. The application thread may submit the follow-up queries to the cache processing 116 at the cache API 118, with the cache processing 116 then passing them to the data store 102 at data retrieval API 108. In another implementation, the application thread may itself submit the follow-up queries directly to the data store 102 at the data retrieval API 108.

FIG. 4 shows an example method 350 for generating the key 206 identifying a query for opaque objects and for searching existing metadata cache entries 136 within the metadata cache structure 132 for the generated key 206. The method 350 can be used to implement parts 304, 306, and 308 of the method 300. Like the method 300, the method 350 can be performed by the cache processing 116, and thus can be implemented as the cache processing program code 114 executable by the processor 154 and stored on a non-transitory computer-readable data storage medium, such as the memory 104.

The cache processing 116 serializes the query received from the application 112 (352). Specifically, parameter data of the query can be serialized into a single text string, and may contain the parameter values in the order in which they appear when the query is passed to the data retrieval API 108. String values may be added in a canonical form that removes information irrelevant to the data store 102. For example, letters may be converted to all lowercase. Values of other types may be converted to a canonical string representation. A separator symbol that is not permitted in any parameter can be used to delimit the parameter values within the serialized query.

The cache processing 116 then generates a hash of the serialized query (354). Any hash technique can be used that results in a hash that can be represented as a specified number of hexadecimal characters, such as two. In one implementation, the hash technique is as follows. Two variables Accum and Rot are initialized to zero. For each byte of the serialized query, InRot is set to the byte as left-rotated by Rot bits. An exclusive-or (XOR) operation is performed on Accum and InRot, and then Rot is incremented, modulo eight. Accum is then converted to a two-character hexadecimal representation, as the hash.

The cache processing 116 prepends the hash to the serialized query (356), such that the serialized query as prepended with the hash forms the key 206. Such a generated key 206 provides for fast searching of the metadata cache entries 136 for a metadata cache entry 136 having a matching key 206. Just the initial two (or other specified number of characters) of the key 206 of each metadata cache entry 136 corresponding to the prepended hash have to be inspected for the prepended hash of the generated key 206. If a matching metadata cache entry 136 is located, just then is the remainder of the key 206 of the metadata cache entry 136 inspected to verify that it matches the remainder of the generated key 206. Such verification is performed if the hash technique can generate the same hash for different queries.

Specifically, then, the cache processing 116 sets the current metadata cache entry 136 to the first metadata cache entry 136 within the metadata cache structure 132 (358). If the hash of the key 206 of the current metadata cache entry 136 (e.g., the first two characters of the key 206) does not match the hash of the generated key 206 (e.g., the first two characters of the generated key 206) (360), then the key 206 definitively does not match the generated key 206. Therefore, if the current metadata cache entry 136 is not the last metadata cache entry 136 within the metadata cache structure 132 (362), the cache processing 116 advances the current metadata cache entry 136 to the next metadata cache entry 136 within the metadata cache structure 132 (364), and again inspects the hash of the key 206 of the current metadata cache entry 136 against the hash of the generated key 206.

If the hash of the key 206 of the current metadata cache entry 136 does match the hash of the generated key 206 (360), then the key 206 potentially matches the generated key 206. Therefore, the cache processing 116 inspects the remainder of the key 206 of the current metadata cache entry 136 (i.e., the serialized query of the key 206) vis-à-vis the remainder of the generated key 206 (i.e., the serialized query of the generated key 206). If the serialized query of the key 206 of the current metadata cache entry 136 matches the serialized query of the generated key 206 (366), then the current metadata cache entry 136 is the metadata cache entry 136 for the query, and the method 350 proceeds to part 310 of the method 300.

If the serialized query of the key 206 of the current metadata cache entry 136 does not match the serialized query of the generated key 206 (366), however, then the current metadata cache entry 136 is not the metadata cache entry 136 for the query. The cache processing 116 therefore advances the current metadata cache entry 136 to the next metadata cache entry 136 within the metadata cache structure 132 (364) if the current metadata cache entry 136 is not the last metadata cache entry 136 within the metadata cache structure (362), as before. If the current metadata cache entry 136 is the last metadata cache entry 136 within the metadata cache structure 132 (362), however, then no metadata cache entry 136 for the query exists within the metadata cache structure 132. The method 350 thus proceeds to part 318 of the method 300.

FIG. 5 shows an example method 500 for evicting a cache entry 128 from the opaque object cache 130, including deleting the associated metadata cache entry 136 from the metadata cache structure 132. Like the method 300, the method 500 can be performed by the cache processing 116, and can be implemented as the cache processing program code 114 executable by the processor 154 and stored on a non-transitory computer-readable data storage medium, such as the memory 104. Eviction can effectively occur over multiple stages.

If a cache entry 128 has been indicated as being stale, if a cache entry 128 has expired, or if a cache entry 128 is subject to early eviction, the cache entry 128 is effectively removed from the cache 130 and cannot be reused. That is, the memory location 126 at which the opaque objects 106 are stored is no longer considered as a cache entry 128 within the cache 130, which means that the handle 202 to the memory location 126 will not be returned if the same query is submitted by another application thread. In the method 300, for instance, the cache processing 116 does not proceed to part 310 if a cache entry 128 is stale, expired, or subject to early eviction.

However, even if the memory location 126 is no longer considered as a cache entry 128 within the cache 130, the opaque objects 106 remain stored at the memory location 126 until there are no application threads using the opaque objects 106. That is, release of the opaque objects 106 at the data store 102, via the data retrieval API 108, is deferred until all application threads have released the opaque objects 106 via the cache API 118. This means that while the cache entry 128 is not considered part of the cache 130, the cache entry 128 is not actually deleted from memory 104 (e.g., released at the data store 102) so long as any application thread is still using the opaque objects 106 cached at the cache entry 128. No new application threads will be permitted to use the cache entry 128, though, as noted above.

The method 400 specifically has four entry points. First, the cache processing 116 can receive from an application thread the release of cached opaque objects 106 at the cache API 118 (402). As part of this received opaque object release, the cache processing 116 receives the handle 202 identifying the memory location 126 corresponding to the cache entry 128 at which the opaque objects 106 are stored, and otherwise may receive the opaque context including the cache metadata 204. The application thread has the handle 202 and the opaque context since this information was returned to the thread when it previously submitted a new query to the cache processing 116 via the cache API, per the method 300.

The application thread releases the opaque objects 106 via the cache API 118 when the thread is no longer using the opaque objects 106. Therefore, the cache processing 116 decrements the use count 218 within the metadata cache entry 136 having the received handle 202 (404). If the cache entry 128 corresponding to the metadata cache entry 136 is not stale (per the staleness 220), has not expired (per the expiration time 210 or per the creation time 208 and the maximum cache entry expiration time 256), and is not subject to early eviction (per the early eviction 222) (406), then the method 400 is finished. That is, the cache processing 116 defers release of the opaque objects at the data store 102 via the data retrieval API 108 (408). This means that the cache entry 128 can still be used by other application threads submitting new queries having the key 206. The memory location 126 at which the opaque objects 106 are stored is still treated as a cache entry 128 of the cache 130.

However, if the cache entry 128 corresponding to the metadata cache entry 136 is stale, has expired, or is subject to early eviction (406), then the cache processing 116 may evict the cache entry 128 from the cache 130 via release of the opaque objects 106 stored at the data store 102 via the data retrieval API 108. Specifically, if the use count 218 of the metadata cache entry 136 is now zero (410), then this means that no other application threads are using the opaque objects 106. Therefore, the cache entry 128 can be evicted from the cache 130 since the cache entry 128 is stale, has expired, or is subject to early eviction. The cache processing 116 thus deletes the metadata cache entry 136 from the metadata cache structure 132 (412), and proceeds to release the opaque objects 106 at the data store 102 via the data retrieval API 108 (414). The memory location 126 at which the opaque objects 106 were stored is therefore freed and can be reused.

However, if the use count 218 of the metadata cache entry 136 is not yet zero (410), then the cache processing 116 still cannot yet evict the cache entry 128 from the cache 130 because one or more other application threads are still using the opaque objects 106 stored at the corresponding memory location 126. Rather, the cache processing 116 defers release of the opaque objects 106 at the data store 102 (408), as before. Therefore, even if the cache entry 128 is stale, has expired or is subject to early eviction, opaque object release at the data store 102 (via the data retrieval API 108) is deferred so long as any application thread is using the opaque objects 106 stored at the memory location 126 corresponding to the cache entry 128.

The second entry point to the method 400 is when the cache processing 116 receives from an application thread indication at the cache API 118 that the cached opaque objects 106 are stale (416). The application thread also provides the handle 202 or otherwise provides a context of the cache metadata 204 so that the cache processing 116 is able to identify the memory location 126 at which the opaque objects 106 are stored, and thus the cache entry 128 in question, via the corresponding metadata cache entry 136. The cache processing 116 sets the flag indicating staleness 220 within this metadata cache entry 136 (418).

Because the cache entry 128 is now stale, the corresponding memory location 126 at which the opaque objects 106 are stored is no longer considered or treated as part of the cache 130. Therefore, the number 260 of cache entries 128 within the cache 130 is decremented within the global metadata cache entry 138 of the metadata cache structure 132 (420). Similarly, the total size 258 of the cache 130 of the global metadata cache entry 138 is decreased by the size 214 of the cache entry 128 within the metadata cache entry 136 (422).

When a cache entry 128 is indicating as being stale, the cache entry 128 may or may not be in use. That is, there may or may not be application threads currently using the opaque objects 106 stored at the memory location 126. If there are any application threads currently using the opaque objects 106, then the opaque objects 106 cannot yet be released at the data store 102. That is, if the use count 218 of the cache entry 128 within the metadata cache entry 136 is unequal to zero (410), then opaque object release at the data store 102 is deferred (408). Just if there are no application threads currently using the opaque objects stored at the memory location 126 are the opaque objects 106 released at the data store 102. That is, as before, if the use count 218 is equal to zero (410), then the metadata cache entry 136 can be deleted (412) and the opaque objects released at the data store 102 via the data retrieval API 108 (414).

The third and fourth entry points to the method 400 are treated similar to the second entry point. The third entry point is when the cache entry 128 is determined to have expired (424). As noted, this can be determined when the current time is past the expiration time 210 of the corresponding metadata cache entry 136, or when the current time minus the maximum cache entry expiration time 256 is past the creation time 208 of the corresponding metadata cache entry 136.

Cache entries 128 may be inspected for expiration in the method 400 at a number of different times. All the cache entries 128 within the cache 130 may be periodically inspected for expiration. The cache entries 128 may be inspected as they are traversed in the method 300 during searching for a matching key 206 in part 306, or when determining whether the cache 130 can accommodate opaque objects 106 in part 324. A cache entry 128 may be inspected for expiration when receiving the release of the opaque objects 106 stored at the corresponding memory location 126 from an application thread via the cache API in part 402 of the method 400.

The fourth entry point to the method 400 is when the cache entry 128 is determined to be subject to early eviction (426). As noted, the corresponding metadata cache entry 136 can have a flag indicating that the cache entry 128 is subject to early eviction 222. The early eviction 222 flag for cache entries 128 can be inspected in the method 400 at the same times as the cache entries 128 are inspected for expiration noted above. Whether a cache entry 128 is subject to early eviction can also be performed in part 328 of the method 300, in which case the early eviction 222 flag does not have to be present since the method 400 is immediately performed.

FIG. 6 shows an example method 600 for selecting cache entries 128 to evict early from the cache 130. Like the method 300, the method 600 can be performed by the cache processing 116, and can be implemented as the cache processing program code 114 executable by the processor 154 and stored on a non-transitory computer-readable data storage medium, such as the memory 104. The method 600 can specifically be performed to implement part 328 of the method 300.

In the method 600, the cache processing 116 randomly selects a specified number of set-aside cache entries 128 (502). The set-aside cache entries 128 are cache entries 128 that will definitively not be early-evicted from the cache 130, but rather are used as a baseline to which to compare the other cache entries 128 to determine which of these other cache entries 128, if any, should be subject to early eviction. In one implementation, the specified number of side-aside cache entries 128 that are randomly selected is equal to the total number 260 of cache entries 128 per the global metadata cache entry 138, divided by Euler's number (i.e., e=2.71828 . . . ), as rounded to the nearest, prior, or next whole number (i.e., integer). In this case, it is said that the specified number is equal to a whole number based on the total number 260 of cache entries 128 divided by Euler's number.

The method 600 employs a utility function, a specific example of which is described later in the detailed description. For a cache entry 128, the utility function outputs a utility score from input based on the cache metadata 204 for the cache entry 128 per the corresponding metadata cache entry 136. The utility score is a measure of the utility of the opaque objects 106 cached at the cache entry 128. The utility of opaque objects 106 cached at a cache entry 128 having a lower utility score is less than the utility of opaque objects 106 cached at a cache entry 128 having a higher utility score. Therefore, cache entries 128 having lower utility scores may be subject to early eviction.

In the method 600, the threshold against which utility scores of cache entries 502 are compared to identify those that are to be subject to early eviction is computed as the lowest utility score of any set-aside cache entry 128. The cache processing 116 resets the lowest utility score to a maximum value, which may be any value higher than the maximum possible value that the utility function can output for any cache entry 128 (504). The cache processing 116 also sets the current cache entry 128 to the first set-aside cache entry 128 (506).

The cache processing 116 computes the utility score of the current cache entry 128 (508). If the computed utility score is less than the lowest utility score (510), then the cache processing 116 sets the lowest utility score to the computed utility score (512). This process is repeated until all the set-aside cache entries 128 have been processed, such that the lowest utility score of any set-side cache entry 128 is determined. Specifically, if the current cache entry 128 is not the last set-aside cache entry 128 (514), then the cache processing sets the current cache entry 128 to the next set-side cache entry 128 (516), and again computes the utility score of the current cache entry 128 (508) as before.

Once all the set-aside cache entries 128 have been processed, such that the current cache entry 128 is the last set-aside cache entry 128 (514), the other cache entries 128 (i.e., the cache entries 128 other than the set-aside cache entries 128) are processed. The other cache entries 128 having utility scores less than the lowest utility score of any set-aside cache entry 128 is selected as subject to early eviction. Specifically, the cache processing 116 sets the current cache entry 128 to the first cache entry that is not a set-aside cache entry (518), and computes the utility score of the current cache entry 128 (520).

If the computed utility score is less than the lowest utility score of any set-aside cache entry 128 (522), then the current cache entry 128 is early-evicted (524). For instance, as noted, the early eviction 222 flag of the corresponding metadata cache entry 136 may be set, and/or the method 400 may be immediately performed at part 426. (In another implementation, rather than setting an early eviction 222 flag of the corresponding metadata cache entry 136, the current cache entry 128 may be moved to another collection of cache entries 128 that are subject to eviction.) If the current cache entry 128 is not the last cache entry 128 that is not a set-aside cache entry 128 (i.e., if the current cache entry 128 is not the last cache entry 128 of the cache entries 128 other than the set-aside cache entries 128) (526), then the cache processing 116 sets the current cache entry 128 to the next cache entry 128 that is not a set-aside cache entry 128 (528), and again computes the utility score of the current cache entry 128 (520), as before. Once all the cache entries 128 other than the set-aside cache entries 128 have been processed, such that the current cache entry 128 is the last cache entry 128 that is not a set-aside cache entry 128 (526), then the method 500 is finished (530).

In one implementation, the utility function may be a linear combination of weighted and normalized cache entry factors. The cache entry factors are specifically normalized so that each cache entry factor has the same scale, such as from zero to one. The cache entry factors are specifically weighted by corresponding constants that may be preset or specified by a user, so that certain cache entry factors contribute to the utility score more than other cache entry factors.

The weighted and normalized cache entry factors can include one or more of the following. A first weighted and normalized cache entry factor is the weighted quotient of the expiration time 210 of a cache entry 128 and the maximum cache entry expiration time 256. This cache entry factor is the remaining lifetime of the cache entry 128, such that the closer the cache entry 128 is to expiring, the lower the cache entry factor is, and the greater likelihood that the cache entry 128 will be selected for early eviction.

A second weighted and normalized cache entry factor is the weighted quotient of the current hit count 216 of the cache entry 128 and an estimated maximum cache entry hit count. The estimated maximum cache entry hit count may be preset, estimated at startup, and/or adjusted during cache operation. The estimated maximum cache entry hit count may be estimated based on the maximum cache entry expiration time 256, on the assumption that a longer maximum cache entry expiration time 256 provides a cache entry 128 more time to be reused. This cache entry factor is the frequency of the cache entry 128 based on the total number of hits (per the hit count 216) of the cache entry 128. The cache entry factor may be clamped to one to discount very popular cache entries 128. Outliers may also be discounted. In another implementation, the cache entry factor may be clamped using a sigmoid function (i.e., such that the cache entry factor is equal to the sigmoid of the weighted quotient of the current hit count 216 and the estimated maximum cache entry hit count), or have a hard cutoff.

A third weighted and normalized cache entry factor is the weighted difference of one and a quotient of the last usage time 212 of the cache entry 128 and the maximum cache entry expiration time 256. A weighted difference is used in this respect since a smaller last usage time 212 should result in a larger utility score. This cache entry factor is the recency of the cache entry 128, where the more recently a cache entry 128 has been used, the lower the likelihood that the cache entry 128 will be evicted.

A fourth weighted and normalized cache entry factor is the weighted quotient of a number of specified characters within the key 206 identifying the query for the cache entry 128 and an estimated maximum number of specified characters of the key 206 of any cache entry 128. The specified characters may be punctuation characters, for instance. Similar to the second cache entry factor, this cache entry factor may be clamped to one, clamped using a sigmoid function, or clamped to a hard cutoff, and outliers may be discounted. The maximum number of specified characters of the key 206 of any cache entry 128 may be estimated based on the key serialization technique being employed, or otherwise preset or specified by a user. This cache entry factor is the complexity of the key 206 of the cache entry 128. The greater the complexity, the greater the work the data store 102 likely has to do to retrieve the opaque objects 106 satisfying the query, and thus the greater the value in retaining the cache entry 128 and the lower the likelihood that the cache entry 128 will be evicted early.

A fifth weighted and normalized cache entry factor is the weighted difference of one and a quotient of the size 214 of the cache entry 128 and an estimated maximum cache entry size of any cache entry 128. This cache entry can also be clamped to one, clamped using a sigmoid function, or clamped to a hard cutoff. This cache entry is indicative of the amount of memory 104 that the cached opaque objects 106 occupy at the memory location 126. The maximum cache entry size of any cache entry 128 may be preset or specified by a user.

In the described implementation, the greater the size 214 of the cache entry 128, the lower the utility score, and thus the more likely the cache entry 128 will be subject to early eviction, on the assumption that evicting a large cache entry 128 makes room for a larger number of smaller cache entries 128 within the cache 130. However, in another implementation, this cache entry may instead be the weighted quotient of the size 214 of the cache entry 128 and the estimated maximum cache entry size of any cache entry 128. In that case, the greater the size 214 of the cache entry 128, the higher the utility score, and thus the less likely the cache entry 128 will be subject to early eviction, on the assumption that the data store 102 has to do more work to retrieve the opaque objects 106, and thus the greater the value in retaining the cache entry 128 within the cache 130.

In one implementation, as cache entries 128 are added to the cache 130 in the method 300, each cache entry 128 is assigned to one of a number of history buckets, with historical statistics maintained on a per-history bucket basis at eviction. Such per-history bucket historical statistics are used as a middle ground between not maintaining any historical statistics on a per-query basis and maintaining historical statistics on a per-query basis. While the metadata cache entry 136 for a cache entry 128 stores statistics while the cache entry 128 remains in the cache 130, once the opaque objects 106 in question have been released at the data store 102 via the data retrieval API 108, the metadata cache entry 136 is deleted and these statistics lost. Using history bucket statistics, by comparison, ensures that historical statistics will be maintained for the cache entries 128 on a per-history bucket basis. These historical statistics can then be used as the basis for other weighted and normalized cache entry factors of a cache entry 128.

For instance, one such weighted and normalized cache entry factor for a given cache entry 128 may be the weighted quotient of the current average hit count of the cache entries 128 assigned to the same history bucket as the given cache entry 128, and the estimated maximum cache entry hit count. This is similar to the second weighted and normalized cache entry factor described above, but instead of considering the hit count 216 of the cache entry 128 itself, the average historical hit count of the cache entries 128 that have been assigned to the same history bucket is considered. The average historical hit count for a history bucket is maintained even as cache entries 128 are removed from the cache 130.

Another such weighted and normalized cache entry factor for a given cache entry 128 may be the weighted difference of one and the quotient of an average last usage time of the different cache entries assigned to the bucket to which the cache entry 128 has been assigned and maximum cache entry expiration time 256. This is similar to the first weighted and normalized cache entry factor describe above, but instead of considering the last usage time 212 of the cache entry itself, the average last usage time of the cache entries 128 that have been assigned to the same history bucket is considered. The average last usage time for a history bucket is maintained even as cache entries 128 are removed from the cache 130.

In one implementation, the history bucket to which a cache entry 128 is assigned is updated at eviction, such as between parts 410 and 412 of the method 400. The number of cache entries 128 assigned to the history bucket is incremented. The total hit count of the cache entries 128 assigned to the history bucket is increased by the hit count 216 of the cache entry 128 at eviction. The average hit count for the history bucket can then be calculated as the total hit count divided by the number of cache entries 128. The sum of differences between the expiration time 210 and the last usage time 212 of each cache entry 128 assigned to the history bucket can be increased by the difference between the expiration time 210 and the last usage time 212 of the cache entry 128 being evicted. This sum of differences can serve as a proxy as the average last usage time of the cache entries 128 that have been assigned to the history bucket.

In one implementation, the historical statistics may be maintained for each history bucket on a decaying average basis, to weight the statistics more heavily towards more recent cache entries 128 assigned to the history buckets. In one implementation, the weighted and normalized cache entry factors based on the per-history bucket historical statistics may not be used to calculate the utility score until a specified number of cache entries 128 have been evicted, so that sufficient historical statistics are calculated before they are used for early eviction purposes. The number of history buckets, and how cache entries 128 are assigned to history buckets, can differ by implementation as well.

In one implementation, a cache entry 128 may be assigned to a history bucket based on the length of its key 206, based on the size 214 of its opaque objects 106, and based on the key 206 itself. For instance, there may be sixty-four history buckets, with six bits used to identify each history bucket. Two bits may represent one of four classes of key length, such that the bits for a given cache entry 128 depend on which class the cache entry 128 is assigned based on the length of its key 206. Two bits may similarly represent one of four classes of cached opaque objects size, such that the bits for a given cache entry 128 depend on which class the cache entry 128 is assigned based on its size 214. Finally, two bits may be specified key bits, such as the lowest-order key hash bits, such that the bits for a given cache entry 128 depend on these specified bits of the key 206 of the cache entry 128.

Figure 7:
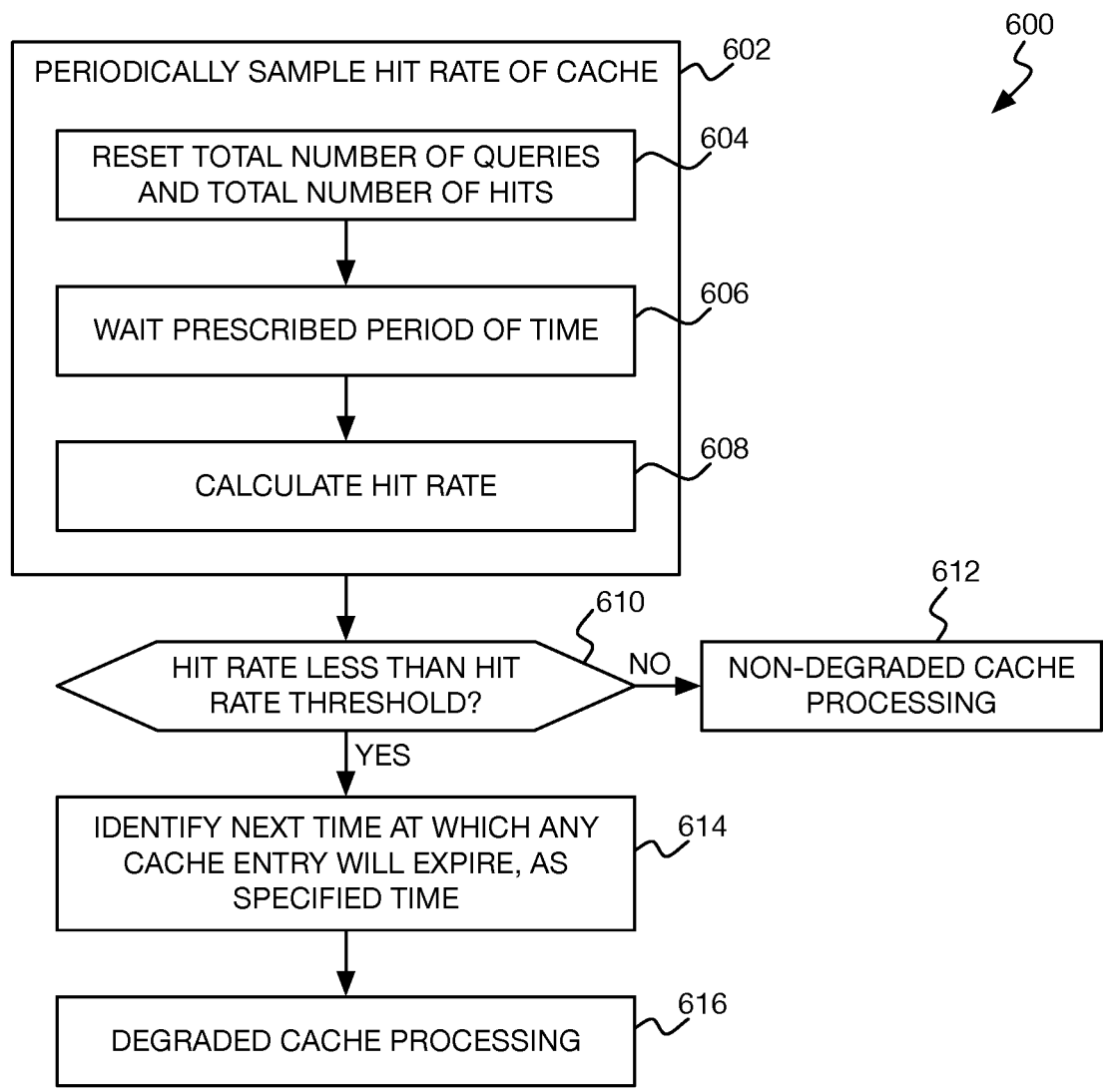
FIG. 7 is a flowchart of an example method for introspection of the opaque object cache of FIG. 1, and in conjunction with which the methods of FIGS. 3 and 5 are used during non-degraded cache processing.

FIG. 7 shows an example method 600 for introspection of the opaque object cache 130 during operation. Introspection is the process of the cache processing 116 self-monitoring the performance of the cache 130. Like the method 300, the method 600 can be performed by the cache processing 116, and can be implemented as the cache processing program code 114 executable by the processor 154 and stored on a non-transitory computer-readable data storage medium, such as the memory 104.

Monitoring cache performance can hedge against poor performance, by shifting the cache 130 into degraded cache performance processing when the cache processing 116 detects that the cache 130 is operating poorly. Non-degraded cache performance processing is the cache processing of the methods 300 and 400 that have been described, which are respectively performed when a new query is received and when a cache entry 128 is evicted from the cache 130. Degraded cache performance processing, by comparison, is described later in the detailed description.

In the example, the hit rate of the cache 130 is used as a proxy for cache performance. The higher the hit rate, the better the performance of the cache 130, and the lower the hit rate, the worse the performance. The hit rate of the cache 130 is the total number 264 of hits maintained in the global metadata cache entry 138, divided by the total number 262 of received queries that is also maintained in the global metadata cache entry 138. The hit rate threshold 266 of the global metadata cache entry 138 is the threshold below which the cache 130 is considering as having degraded performance.

In the method 600, the hit rate of the cache 130 is periodically sampled (602). For instance, the method 600 may be performed every specified number of minutes, such as every ten minutes. As such, when the method 600 is performed, the cache processing 116 resets both the total number 264 of hits and the total number 262 of queries within the global metadata cache entry 138 to zero (604).

The method 600 then waits for the prescribed period of time (606), so that the total number 264 of hits and the total number 262 of queries can be incremented as the method 300 is performed. In one implementation, the incrementation of the number 264 of hits in part 312 and the incrementation of the number 262 of queries in part 312 or part 330 are performed just every specified time the method 300 is performed. For instance, the number 264 of hits and the number 262 of queries may be incremented every fifth time the method 300 is performed, every five seconds, and so on.

The cache processing 116 then calculates the overall hit rate of the cache 130 (608), by dividing the total number 264 of hits by the total number 262 of queries. If the calculated hit rate is not less than (e.g., is greater than) the hit rate threshold 266 (610), then the cache processing 116 continues with non-degraded cache processing (612). The cache 130 is not considered to be in a degraded state. Therefore, as new queries are received, the method 300 is performed, and further the method 400 is performed for cache entry eviction.

However, if the calculated hit rate is less than the hit rate threshold 266 (610), then the cache 130 is considered to be in a degraded state. The cache processing 116 identifies the next time at which any cache entry 128 will expire (614), which is considered a specified time used during degraded cache processing. The next time at which any cache entry 128 will expire is the expiration time 210 of the metadata cache entry 136 corresponding to any cache entry 128 that will occur next.

The cache processing 116 then continues with degraded cache processing (616). Until the noted specified time occurs, no cache entries 128 may be evicted from the cache 130 except for cache entries 128 that are indicated as being stale (i.e., for cache consistency purposes). New cache entries 128 are thus added to the cache 130 just if the cache 130 can accommodate the opaque objects 106 to be cached without having to evict any existing cache entries 128. The methods 300 and 400 are not performed during degraded cache processing. Rather, other methods are, as is now described.

Figure 8:
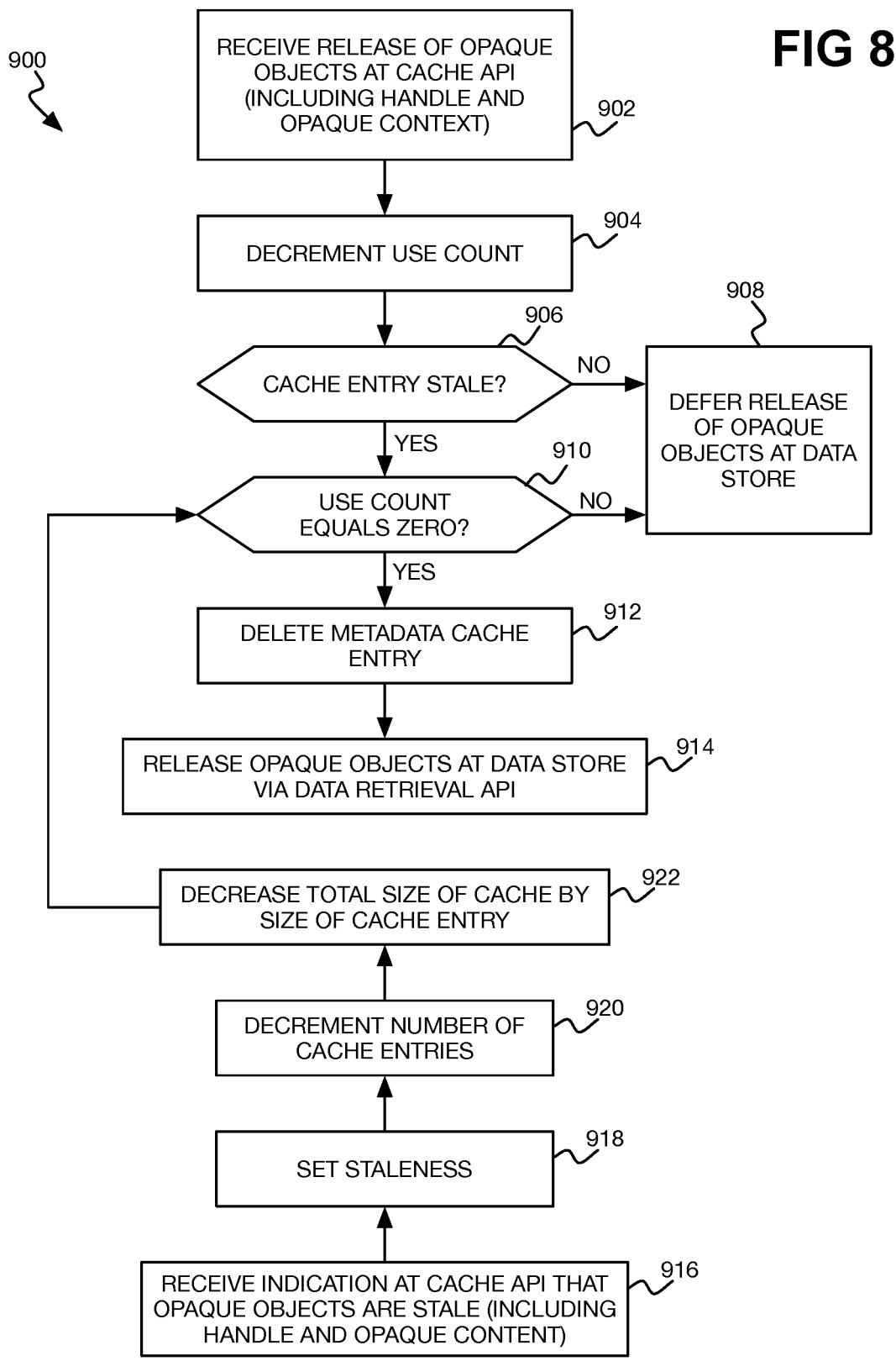
FIG. 8 is a flowchart of an example method that is used in lieu of the method of FIG. 5 during degraded cache processing in conjunction with the method of FIG. 7.

FIG. 8 shows an example method 900 that is performed during degraded cache processing in lieu of the method 400 for evicting a cache entry 128 from the opaque object cache 130. Like the method 300, the method 900 can be performed by the cache processing 116, and can be implemented as the cache processing program code 114 executable by the processor 154 and stored on a non-transitory computer-readable data storage medium, such as the memory 104. The method 900 is specifically performed until the specified time referenced in the method 600 has been reached—that is, until the next expiration time 210 at which any cache entry 128 has occurred.

As in the method 400, eviction can effectively occur over multiple stages in the method 900. However, unlike the method 400, the method 900 has two entry points, instead of four. There are entry points corresponding to the release of cached opaque objects 106 at the cache API 118 by an application thread and corresponding to the indication by an application thread at the cache API 118 that cached opaque objects 106 are stale in the method 900. There are no entry points corresponding to expiration of a cache entry 128 or that a cache entry 128 is subject to early eviction in the method 900, since no cache entries 128 are evicted except for consistency purposes during degraded cache processing.

The first entry point to the method 900 is when the cache processing 116 receives from an application thread the release of cached opaque objects 106 at the cache API 118 (902), as in part 402 of the method 400. The cache processing 116 decrements the use count 218 within the metadata cache entry 136 corresponding to the cache entry 128 at which the opaque objects 106 are cached (904), as in part 404 of the method 400. However, the cache entry 128 can be evicted just if the cache entry 128 has been indicated as being stale (and the cache entry 128 is no longer being used by any application thread).

Therefore, if the cache entry 128 is not stale (906), then release of the opaque objects at the data store 102 is deferred (908), as in part 408 of the method 400. Similarly, if the use count 218 of the cache entry 128 is unequal to zero (910), then release of the opaque objects at the data store 102 is deferred (908). If the cache entry 128 is both stale (906) and has a use count 218 equal to zero (910), then the cache entry 128 is evicted. As in parts 412 and 414 of the method 400, the cache processing 116 deletes the corresponding metadata cache entry 136 (912), and releases the opaque objects 106 at the data store 102 via the data retrieval API (914).

The second entry point to the method 900 is when the cache processing 116 receives from an application thread indication at the cache API that the cached opaque objects 106 are stale (916), as in part 416 of the method 400. The cache processing 116 sets the flag indicating staleness 220 within the metadata cache entry 136 corresponding to the cache entry 128 at which the opaque objects 106 are cached (918), as in part 418 of the method 400. As in parts 420 and 422 of the method 400, the cache processing 116 decrements the number 260 of cache entries 128 within the cache 130 (920), and decreases the total size 258 of the cache 130 by the size 214 of the cache entry 128 in question (922).

The cache entry 128 is then evicted if no application threads are currently using the cache. Therefore, if the use count 218 of the cache entry 128 is unequal to zero (910), the cache processing 116 defers release of the opaque objects 106 at the data store 102 (908) as before. Just if the use count 218 is equal to zero (910) does the cache processing 116 delete the corresponding metadata cache entry (912) and release the opaque objects 106 at the data store 102 via the data retrieval API 108 (914).

Figure 9:
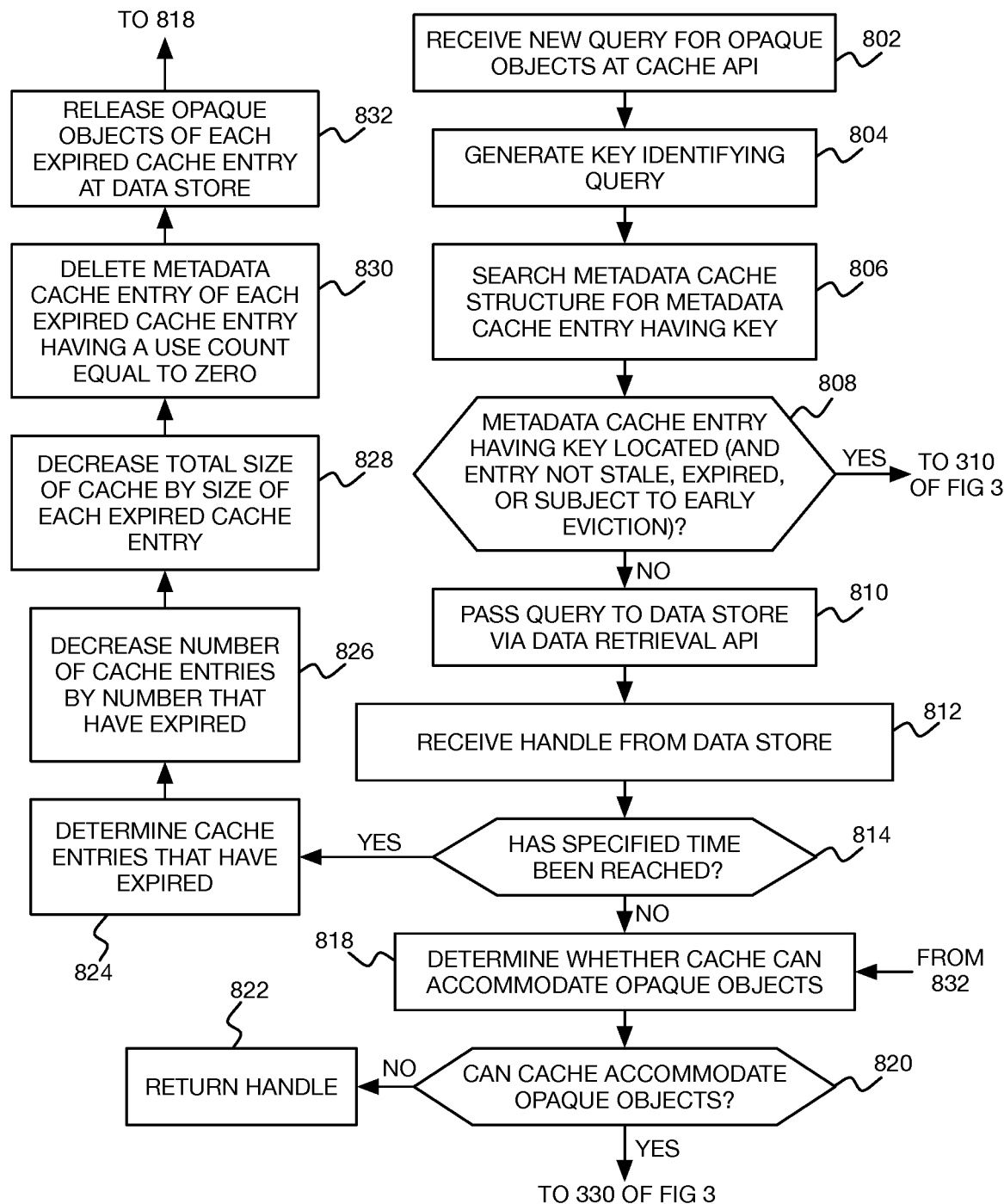
FIG. 9 is a flowchart of an example method that is used in lieu of the method of FIG. 3 during degraded cache processing in conjunction with the method of FIG. 7.

FIG. 9 shows an example method 800 that is performed during degraded cache processing in lieu of the method 300 for processing a new query. Like the method 300, the method 800 can be performed by the cache processing 116, and can be implemented as the cache processing program code 114 executable by the processor 154 and stored on a non-transitory computer-readable data storage medium, such as the memory 104. The method 800 is specifically performed each time a new query is received during degraded cache processing, until the method 800 returns operation of the cache 130 to non-degraded cache processing, at which time the method 300 will be performed the next time a new query is received.

The cache processing 116 receives from an application thread a new query for opaque objects 106 at the cache API 118 (802), as in part 302 of the method 300, and generates a key 206 identifying the received query (804), as in part 304 of the method 300. The cache processing 116 searches the metadata cache structure 132 for a metadata cache entry 136 having the generated key 206 (806), as in part 306 of the method 300. If there is a metadata cache entry 136 having the key 206, and which corresponds to a cache entry 128 that is not stale, has not expired, and is not subject to early eviction (808), then the cache processing 116 proceeds to part 310 of the method 300. However, the cache 130 remains in a degraded state, such that the method 800 is again performed when another new query is received.

If there is not a metadata cache entry 136 having the key 206, and which corresponds to a cache entry 128 that is not stale, has not expired, and is not subject to early eviction (808), then the cache processing 116 passes the received query to the data store 102 via the data retrieval API 108 (810), as in part 318 of the method 300. The cache processing 116 responsively receives a handle 202 to the memory location 126 at which the data store 102 has stored the opaque objects 106 satisfying the query (812), as in part 320 of the method 300. However, in the method 800, if the specified time referenced in the method 600 has not yet been reached (814), then a new cache entry 128 corresponding to the memory location 126 is added to the cache 130 just if the cache 130 can accommodate the opaque objects 106.

Specifically, the cache processing 116 determines whether the cache can accommodate the opaque objects 106 (818), as in part 324 of the method 300. If the cache 130 cannot accommodate the opaque objects 106 (820), then no cache entry 128 is added to the cache 130. Rather, the cache processing 116 just returns the handle 202 to the memory location 126 at which the opaque objects 106 are stored (822). The memory location 126, in other words, is not treated as a cache entry 128 of the cache 130 in this case. By comparison, if the cache 130 can accommodate the opaque objects 106 (820), then a cache entry 128 is added to the cache 130. The cache processing 116 proceeds to part 330 of the method 300. However, the cache 130 remains in a degraded state, such that the method 800 is again performed when another new query is received.

Once the specified time has been reached (814), all expired cache entries 128 are evicted from the cache, and operation of the cache 130 reverts to non-degraded cache processing. Specifically, the cache processing 116 determines all cache entries 128 that have expired (824), such as by inspecting the expiration time 210 of the metadata cache entry 136 of each cache entry 128. The cache processing 116 decreases the number 260 of cache entries 128 maintained in the global metadata cache entry 138 by the number of expired cache entries 128 (826), and similarly decreases the total size 258 of the cache 130 maintained in the global metadata cache entry 138 by the size 214 of each expired cache entry 128 (828).

For each expired cache entry 128 having a use count 218 of zero, the cache processing 116 also deletes the corresponding metadata cache entry 136 (830), and releases at the data store 102 the opaque objects 106 stored at the corresponding memory location 126 via the data retrieval API (832). The cache processing 116 then proceeds to part 818 as has been described. Therefore, the cache 130 remains in a degraded state, such that the method 800 is again performed when another new query is received.

Ultimately, the cache 130 exits a degraded state when two conditions have been satisfied. First, the specified time referenced in part 814 has been reached. Second, as the method 600 of FIG. 7 is periodically performed, the method 600 identifies that the cache 130 is to enter a non-degraded state, per part 612. In one implementation, after part 832 is performed (i.e., the specified time has been reached and expired cache entries 128 have been evicted from the cache 130), the method 800 can proceed immediately to part 602 of the method 600, in parallel to (or before or after) proceeding to part 818. In this implementation, then, once the specified time has been reached in part 814, whether the cache 130 can exit a non-degraded state is immediately determined by performing the method 600, instead of waiting for the next time that the method 600 is periodically performed.

Techniques have been described for caching opaque objects that may not ordinarily be able to be cached. The techniques treat the memory locations at which opaque objects satisfying queries are stored by the data store that maintains the opaque objects as the cache entries of the opaque object cache. A metadata cache structure is also maintained that stores metadata cache entries corresponding to the cache entries of the cache. By providing for the caching of opaque objects, overall performance can be improved since repeatedly used opaque objects may remain at their memory locations instead of being retrieved from the data store at each use.

I claim:

1. A non-transitory computer-readable data storage medium storing program code executable by a processor to perform cache processing comprising:

receiving, from an application, a query for one or multiple opaque objects stored within a data store and not currently cached within a cache;

in response to receiving the query from the application, passing the query to the data store;

in response to passing the query to the data store, receiving, from the data store, a handle to a memory location at which the data store has temporarily stored a message including the one or multiple opaque objects;

in response to receiving the handle, adding the one or multiple opaque objects to the cache by treating the memory location as a cache entry for the one or multiple opaque objects;

as part of adding the one or multiple opaque objects to the cache, generating cache metadata for the cache entry, and storing the cache metadata and the handle within a metadata cache entry of a metadata cache structure separate from the message; and after adding the one or multiple opaque objects to the cache, returning, to the application, the handle.

2. The non-transitory computer-readable data storage medium of claim 1, wherein the cache metadata includes a key uniquely identifying the query, a creation or expiration time of the cache entry, a last usage time of the cache entry, and an estimated size of the cache entry, and wherein the cache metadata is returned to the application, as an opaque context of the cache entry, along with the handle.

3. The non-transitory computer-readable data storage medium of claim 1, wherein the cache metadata comprises a use count of the opaque objects that is initially set to one as part of adding the opaque objects to the cache and that is incremented each time the query is received while the opaque objects are cached, the cache processing further comprising:

receiving, from the application, release of the opaque objects;

in response to receiving the release, decrementing the use count; and deferring the release of the opaque objects at the data store, such that the opaque objects remain cached within the cache entry, if the cache entry is not stale, has not expired, and is not subject to early eviction, regardless of whether the use count remains unequal to zero after having been decremented.

4. The non-transitory computer-readable data storage medium of claim 3, wherein the cache processing further comprises:

in response to the use count remaining unequal to zero after having been decremented, deferring the release of the opaque objects at the data store, even though the opaque objects are not considered as being cached within the cache entry, if the cache entry is stale, has expired, or is subject to early eviction.

5. The non-transitory computer-readable data storage medium of claim 3, wherein the cache processing further comprises:
in response to the use count reaching zero after having been decremented, evicting the cache entry from the cache if the cache entry is stale, has expired, or is subject to early eviction, by deleting the metadata cache entry within the metadata cache structure and releasing the opaque objects at the data store.

6. The non-transitory computer-readable data storage medium of claim 1, wherein the cache metadata comprises a use count of the opaque objects that is initially set to one as part of adding the opaque objects to the cache and that is incremented each time the query is received while the opaque objects are cached, the cache processing further comprising, in response to receiving an indication from the application that the opaque objects are stale, in response to a determination that the cache entry has expired, or in response to an indication that the cache entry is to be early-evicted:
updating global cache metadata for the cache to decrease a total estimated size of the cache by an estimated size of the cache entry and to decrement a number of cache entries within the cache, such that the opaque objects are not considered as being cached within the cache entry; and
evicting the cache entry from the cache if the use count is equal to zero, by deleting the metadata cache entry within the metadata cache structure and releasing the opaque objects at the data store.

7. The non-transitory computer-readable data storage medium of claim 6, wherein the cache processing further comprises, in response to receiving an indication from the application that the opaque objects are stale, in response to a determination that the cache entry has expired, or in response to an indication that the cache entry is to be early-evicted:
deferring release of the opaque objects at the data store if the use count is unequal to zero, even though the opaque objects are not considered as being cached within the cache entry.

8. The non-transitory computer-readable data storage medium of claim 1, wherein the cache processing further comprises:
prior to adding the opaque objects to the cache, determining that the cache can accommodate the opaque objects;
as part of determining that the cache can accommodate the opaque objects, determining whether an estimated size of the cache entry if added to a total estimated size of the cache exceeds a maximum total cache size of the cache;
in response to determining that the estimated size of the cache entry if added to the total estimated size of the cache does not exceed the maximum total cache size of the cache, proceeding to add the opaque objects to the cache; and
in response to determining that the estimated size of the cache entry if added to the total estimated size of the cache exceeds the maximum total cache size of the cache, early-evicting one or multiple other cache entries from the cache before proceeding to add the opaque objects to the cache.

9. The non-transitory computer-readable data storage medium of claim 8, wherein early-evicting the one or multiple other cache entries from the cache comprises:
randomly selecting a specified number of set-aside cache entries from the cache, the specified number of set-aside cache entries equal to a whole number that is based on a total number of the cache entries in the cache divided by Euler's number;
computing a utility score of each set-aside cache entry using a utility function; and
for each of a plurality of cache entries in the cache other than the set-aside entries from the cache, computing a utility score of the cache entry using the utility function, and early-evicting the cache entry if the utility score of the cache entry is less than a lowest utility score of any set-aside cache entry.

10. The non-transitory computer-readable data storage medium of claim 9, wherein the utility function comprises a linear combination of a plurality of weighted and normalized cache entry factors, and each of the plurality of weighted and normalized cache entry factors for a given cache entry comprise one or multiple of:
a weighted quotient of an expiration time of the given cache entry and a maximum cache entry expiration time;
a weighted quotient of a current hit count of the given cache entry and an estimated maximum cache entry hit count;
a weighted difference of one and a quotient of a last usage time of the given cache entry and the maximum cache entry expiration time;
a weighted quotient of a number of specified characters within a key of the given cache entry and an estimated maximum number of the specified characters of any cache entry key; and
a weighted difference of one and a quotient of a size of the given cache entry and an estimated maximum cache entry size.

11. The non-transitory computer-readable data storage medium of claim 9, wherein as different sets of one or multiple opaque objects are added to the cache as different cache entries, each different cache entry is assigned to a bucket of a plurality of buckets,
and wherein the utility function comprises a linear combination of a plurality of weighted and normalized cache entry factors, and each of the plurality of weighted and normalized cache entry factors for a given cache entry comprise either or both of:
a weighted quotient of a current average hit count of the different cache entries assigned to the bucket to which the given cache entry has been assigned and an estimated maximum cache entry hit count; and
a weighted difference of one and a quotient of an average last usage time of the different cache entries assigned to the bucket to which the cache entry has been assigned and a maximum cache entry expiration time.

12. The non-transitory computer-readable data storage medium of claim 11, wherein each different cache entry is assigned to a bucket based on a length of a key of the different cache entry, a size of the opaque objects of the different cache entry, and the key of the different cache entry.

13. The non-transitory computer-readable data storage medium of claim 1, wherein the cache processing further comprises:
periodically sampling a hit rate of the cache;

in response to determining that the hit rate of the cache is less than a threshold, identifying a time at which any existing cache entry within the cache will expire next;

prior to adding the opaque objects to the cache, determining that the cache can accommodate the opaque objects;

as part of determining that the cache can accommodate the opaque objects, determining whether an estimated size of the cache entry if added to a total estimated size of the cache exceeds a maximum total cache size of the cache;

in response to determining that the estimated size of the cache entry if added to the total estimated size of the cache does not exceed the maximum total cache size of the cache, proceeding to add the opaque objects to the cache;

in response to determining that the estimated size of the cache entry if added to the total estimated size of the cache exceeds the maximum total cache size of the cache and in response to determining that the time at which any existing cache entry within the cache will expire next has not yet occurred, not adding the opaque objects to the cache; and in response to determining that the estimated size of the cache entry if added to the total estimated size of the cache exceeds the maximum total cache size of the cache and in response to determining that the time at which any existing cache entry within the cache will expire next has occurred, evicting all expired cache entries from the cache before proceeding to add the opaque objects to the cache.

14. The non-transitory computer-readable data storage medium of claim 1, wherein the query is a first query, the opaque objects are first opaque objects, the handle is a first handle, the memory location is a first memory location, the message is a first message, the cache entry is for a first cache entry, the cache metadata is first cache metadata, the metadata cache entry is a first metadata cache entry, and the cache processing further comprises:

receiving, from the application, a second query for one or multiple second opaque objects stored within the data store and currently cached within the cache at a second cache entry in that a second memory location at which the data store has temporarily stored a second message including the second opaque objects is treated as the second cache entry;

in response to receiving the second query from the application, searching the metadata cache structure for a second metadata cache entry of the metadata cache structure storing a second handle to the second memory location and second cache metadata for the second cache entry to locate the second cache entry within the cache;

in response to locating the second cache entry within the cache, retrieving the second handle and updating the second cache metadata for the second cache entry stored within the second metadata cache entry of the metadata cache structure to reflect a new last usage time of the second cache entry; and after retrieving the second handle and updating the second cache metadata, returning, to the application, the second handle.

15. The non-transitory computer-readable data storage medium of claim 14, wherein generating the first cache metadata for the first cache entry comprises:

generating a first key uniquely identifying the first query, by serializing the first query; and as part of generating the first key, generating a first hash of the serialized first query and prepending the first hash to the serialized first query.

16. The non-transitory computer-readable data storage medium of claim 15, wherein searching the metadata cache structure for the second metadata cache entry comprises:

serializing the second query as part of a second key uniquely identifying the second query;

generating a second hash of the serialized second query and prepending the second hash to the serialized second query as part of the second key;

searching the metadata cache structure for just the second hash until the second metadata cache entry including the second hash as part of the second key has been found; and after the second metadata cache entry has been found, verifying that the second metadata cache entry also includes the serialized second query as part of the second key.

17. A system comprising:

a network adapter communicatively connected to a data store exposing a data retrieval application programming interface (API) by which one or multiple opaque objects stored within the data store are accessible;

a processor; and a memory storing:

a message in which the data store temporarily stores the one or multiple opaque objects, a memory location in the memory at which the message is stored being treated as a cache entry of a cache for the one or multiple opaque objects;

a metadata cache entry of a metadata cache structure separate from the message and including cache metadata for the cache entry and a handle to the memory location, the cache metadata including a key uniquely identifying a query identifying the one or multiple opaque objects, a creation or expiration time of the cache entry, a last usage time of the cache entry, and an estimated size of the cache entry;

application program code executable by the processor to implement an application; and cache processing program code executable by the processor to implement cache processing exposing a cache API by which the one or multiple opaque objects are accessible by the application, wherein the cache processing:

in response to receiving a query from the application via the cache API for the opaque objects, searches the metadata cache structure for the metadata cache entry to locate the cache entry within the cache;

in response to locating the cache entry within the cache, retrieving the handle and updating the cache metadata for the cache entry stored within the metadata cache entry of the metadata cache structure to reflect a new last usage time of the cache entry; and after retrieving the handle and updating the cache metadata, returning, to the application via the cache API, the handle.

18. The system of claim 17, wherein, as part of searching the metadata cache structure for the metadata cache entry, the cache processing:

serializes the query as part of a key uniquely identifying the query;

generates a hash of the serialized query and prepends the hash to the serialized query as part of the key;

searches the metadata cache structure for just the hash until the metadata cache entry including the hash as part of the key has been found; and after the metadata cache entry has been found, verifying that the metadata cache entry also includes the serialized query as part of the key.

19. The system of claim 17, wherein the query is a first query, the opaque objects are first opaque objects, the handle is a first handle, the memory location is a first memory location, the message is a first message, the cache entry is for a first cache entry, the cache metadata is first cache metadata, the metadata cache entry is a first metadata cache entry, and the cache processing further:

receives, from the application, a second query via the cache API for one or multiple second opaque objects stored within the data store and not currently cache within the cache;

in response to receiving the second query from the application via the cache API, passing the second query to the data store via the data retrieval API;

in response to passing the second query to the data store via the data retrieval API, receiving, from the data store via the data retrieval API, a second handle to a second memory location at which the data store has temporarily stored a second message include the second opaque objects;

in response to receiving the second handle, adding the second opaque objects to the cache by treating the second memory location as a second cache entry for the second opaque objects;

as part of adding the second opaque objects to the cache, generating second cache metadata for the second cache entry, and storing the second cache metadata and the second handle within a second metadata cache entry of the metadata cache structure separate from the message;

after adding the second opaque objects to the cache, returning, to the application, the second handle.

20. A method comprising:

receiving, by cache processing from an application via a cache application programming interface (API) exposed by the cache processing, a query for one or multiple opaque objects stored within a data store and not currently cached within a cache;

in response to receiving the query from the application via the cache API, passing, by the cache processing, the query to the data store via a data retrieval API exposed by the data store;

in response to passing the query to the data store via the data retrieval API, receiving, by the cache processing from the data store via the data retrieval API, a handle to a memory location at which the data store has temporarily stored a message including the one or multiple opaque objects;

in response to receiving the handle, adding, by the cache processing, the one or multiple opaque objects to the cache by treating the memory location as a cache entry for the one or multiple opaque objects;

as part of adding the one or multiple opaque objects to the cache, generating, by the cache processing, cache metadata for the cache entry, and storing the cache metadata and the handle within a metadata cache entry of a metadata cache structure, the cache metadata including a key uniquely identifying the query, a creation or expiration time of the cache entry, a last usage time of the cache entry, and an estimated size of the cache entry; and after adding the one or multiple opaque objects to the cache, returning, by the cache processing to the application, the handle.

* * * * *